(12) United States Patent
Tanaka

(10) Patent No.: US 6,572,382 B2
(45) Date of Patent: Jun. 3, 2003

(54) PAPER PREPARATION SUPPORTING METHOD

(75) Inventor: Nozomu Tanaka, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/911,808

(22) Filed: Jul. 25, 2001

(65) Prior Publication Data

US 2003/0044759 A1 Mar. 6, 2003

(30) Foreign Application Priority Data

Mar. 28, 2001 (JP) .......................... 2001-093063

(51) Int. Cl.⁷ ................................. G09B 7/00

(52) U.S. Cl. ........................................ 434/323

(58) Field of Search ................. 434/323, 322, 434/362, 350

(56) References Cited

U.S. PATENT DOCUMENTS 5,627,940 A * 5/1997 Rohra et al. .................... 704/9
6,418,298 B1 * 7/2002 Sonnenfeld ................. 434/350

FOREIGN PATENT DOCUMENTS

JP 2-98736 4/1990

* cited by examiner

Primary Examiner—Noah P. Kamen
Assistant Examiner—Hyder Ali
(74) Attorney, Agent, or Firm—Staas & Halsey LLP

(57) ABSTRACT

A user inputs the conclusion of a paper using a client device. A server device asks the user a question about a reason to support the inputted conclusion, and the user answers the question using the client device. If the answer is not self-evident, the server device treats the received answer as a new assertion and asks the user a question about a reason to support the new assertion. The server device repeats questions until all reasons inputted by the user become self-evident. The server device displays a logical structure of the paper which indicates a logic of the paper based on the assertion and reason given by the user.

17 Claims, 22 Drawing Sheets

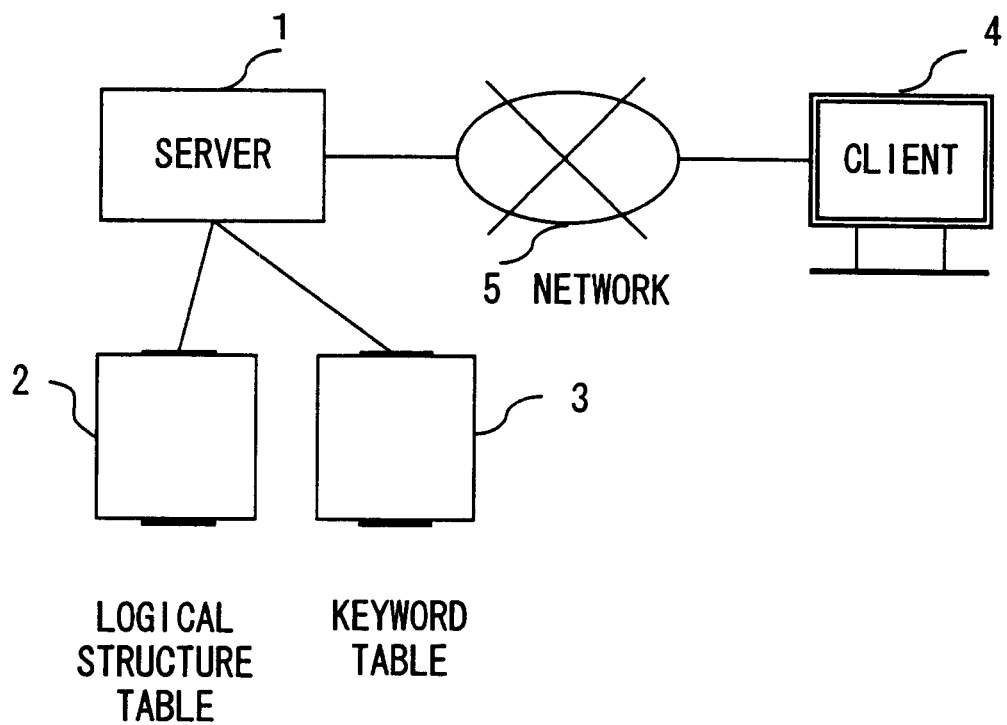
F I G. 1

```
┌─────────────────────────────────┐
│ PREPARATION OF A LOGICAL STRUCTURE │
│                                 │
│                                 │
│                                 │
│ WHAT IS YOUR CONCLUSION?        │
│                                 │
└─────────────────────────────────┘
```
FIG. 3A

```
┌─────────────────────────────────┐
│ PREPARATION OF A LOGICAL STRUCTURE │
│                                 │
│                                 │
│                                 │
│ WHAT IS YOUR CONCLUSION?        │
│ WHALE HUNTING SHOULD BE STOPPED.│
│ /e                              │
│ //e                             │
└─────────────────────────────────┘
```
FIG. 3B

```
┌─────────────────────────────────┐
│ PREPARATION OF A LOGICAL STRUCTURE │
│                                 │
│ WHALE HUNTING SHOULD BE STOPPED. (1)│
│                                 │
│                                 │
│ WHY CAN (1) BE SAID TO BE CORRECT? │
│                                 │
└─────────────────────────────────┘
```
FIG. 3C

```
┌─────────────────────────────────┐
│ PREPARATION OF A LOGICAL STRUCTURE │
│                                 │
│ WHALE HUNTING SHOULD BE STOPPED. (1)│
│                                 │
│ WHY CAN (1) BE SAID TO BE CORRECT? │
│   THERE IS A POSSIBILITY OF THE │
│ EXTINCTION OF WHALES.           │
│   /e                            │
│   THERE IS OTHER FOOD.          │
│   /e                            │
│ //e                             │
└─────────────────────────────────┘
```
FIG. 3D

```
┌─────────────────────────────────┐
│ PREPARATION OF A LOGICAL STRUCTURE │
│                                 │
│ WHALE HUNTING SHOULD BE STOPPED.   (1)│
│   THERE IS A POSSIBILITY OF THE EXTINCTION│
│ OF WHALES.                      (11)│
│   THERE IS OTHER FOOD.          (12)│
│                                 │
│ WHY CAN (11) BE SAID TO BE CORRECT? │
└─────────────────────────────────┘
```
FIG. 3E

```
┌─────────────────────────────────┐
│ PREPARATION OF A LOGICAL STRUCTURE │
│                                 │
│ WHALE HUNTING SHOULD BE STOPPED.   (1)│
│   THERE IS A POSSIBILITY OF THE EXTINCTION│
│ OF WHALES.                      (11)│
│   THERE IS OTHER FOOD.          (12)│
│                                 │
│ WHY CAN (11) BE SAID TO BE CORRECT? │
│   THE NUMBER OF WHALES IS DECREASING.│
│   /e                            │
│   THE NUMBER OF WHALES CANNOT BE│
│ ARTIFICIALLY INCREASED UNLIKE DOMESTIC│
│ ANIMALS.                        │
│   /e                            │
│ //e                             │
└─────────────────────────────────┘
```
FIG. 3F

```
┌─────────────────────────────────┐
│ PREPARATION OF A LOGICAL STRUCTURE │
│                                 │
│ WHALE HUNTING SHOULD BE STOPPED.     (1)│
│   THERE IS A POSSIBILITY OF THE EXTINCTION│
│ OF WHALES.                        (11)│
│   THERE IS OTHER FOOD.            (12)│
│     THE NUMBER OF WHALES IS DECREASING. (111)│
│     THE NUMBER OF WHALES CANNOT BE.... (112)│
│                                 │
│ WHY CAN (12) BE SAID TO BE CORRECT? │
└─────────────────────────────────┘
```
FIG. 3G

```
┌─────────────────────────────────┐
│ PREPARATION OF A LOGICAL STRUCTURE │
│                                 │
│ WHALE HUNTING SHOULD BE STOPPED.     (1)│
│   THERE IS A POSSIBILITY OF THE EXTINCTION│
│ OF WHALES.                        (11)│
│   THERE IS OTHER FOOD.            (12)│
│     THE NUMBER OF WHALES IS DECREASING. (111)│
│     THE NUMBER OF WHALES CANNOT BE.... (112)│
│                                 │
│ WHY CAN (12) BE SAID TO BE CORRECT? │
│   THERE ARE MEAT, FISH AND VEGETABLES.│
│   /e                            │
│ //e                             │
└─────────────────────────────────┘
```
FIG. 3H

```
PREPARATION OF A LOGICAL STRUCTURE

WHALE HUNTING SHOULD BE STOPPED.            (1)
  THERE IS A POSSIBILITY OF THE EXTINCTION
OF WHALES.                                  (11)
    THERE IS OTHER FOOD.                    (12)
      THE NUMBER OF WHALES IS DECREASING.   (111)
      THE NUMBER OF WHALES CANNOT BE....    (112)
      THERE ARE MEAT, FISH AND VEGETABLES.  (121)

WHY CAN (111) BE SAID TO BE CORRECT?
  RETAIN
  /e
  //e
```

FIG. 4A

```
PREPARATION OF A LOGICAL STRUCTURE

WHALE HUNTING SHOULD BE STOPPED.            (1)
  THERE IS A POSSIBILITY OF THE EXTINCTION
OF WHALES.                                  (11)
    THERE IS OTHER FOOD.                    (12)
      THE NUMBER OF WHALES IS DECREASING.   (111)
      THE NUMBER OF WHALES CANNOT BE....    (112)
      THERE ARE MEAT, FISH AND VEGETABLES.  (121)
        RETAIN                              (1111)

WHY CAN (112) BE SAID TO BE CORRECT?
  SELF-EVIDENT
  /e
  //e
```

FIG. 4B

```
PREPARATION OF A LOGICAL STRUCTURE

WHALE HUNTING SHOULD BE STOPPED.            (1)
  THERE IS A POSSIBILITY OF THE EXTINCTION OF
WHALES.                                     (11)
    THERE IS OTHER FOOD.                    (12)
      THE NUMBER OF WHALES IS DECREASING.   (111)
      THE NUMBER OF WHALES CANNOT BE....    (112)
      THERE ARE MEAT, FISH AND VEGETABLES.  (121)
        RETAIN                              (1111)
        SELF-EVIDENT                        (1121)

WHY CAN (121) BE SAID TO BE CORRECT?
  SELF-EVIDENT
  /e
  //e
```

FIG. 4C

```
PREPARATION OF A LOGICAL STRUCTURE

WHALE HUNTING SHOULD BE STOPPED.            (1)
  THERE IS A POSSIBILITY OF THE EXTINCTION OF
WHALES.                                     (11)
    THERE IS OTHER FOOD.                    (12)
      THE NUMBER OF WHALES IS DECREASING.   (111)
      THE NUMBER OF WHALES CANNOT BE....    (112)
      THERE ARE MEAT, FISH AND VEGETABLES.  (121)
        RETAIN                              (1111)
        SELF-EVIDENT                        (1121)
        SELF-EVIDENT                        (1211)

WHY CAN "RETAIN"(1111) BE SAID TO BE CORRECT?
  IT IS BASED ON A METHOD, A RESULT AND A
INTERPRETATION.
  /e
  //e
```

FIG. 4D

```
PREPARATION OF A LOGICAL STRUCTURE

WHALE HUNTING SHOULD BE STOPPED.            (1)
  THERE IS A POSSIBILITY OF THE EXTINCTION
OF WHALES.                                  (11)
    THERE IS OTHER FOOD.                    (12)
      THE NUMBER OF WHALES IS DECREASING.   (111)
      THE NUMBER OF WHALES CANNOT BE....    (112)
      THERE ARE MEAT, FISH AND VEGETABLES.  (121)
        RETAIN                              (1111)
        SELF-EVIDENT                        (1121)
        SELF-EVIDENT                        (1211)
          IT IS BASED ON A METHOD, A RESULT
AND AN INTERPRETATION.                      (11111)

WHY CAN (11111) BE SAID TO BE CORRECT?
  SELF-EVIDENT
  /e
  //e
```

FIG. 4E

```
PREPARATION OF A LOGICAL STRUCTURE

WHALE HUNTING SHOULD BE STOPPED.            (1)
  THERE IS A POSSIBILITY OF THE EXTINCTION OF
WHALES.                                     (11)
    THERE IS OTHER FOOD.                    (12)
      THE NUMBER OF WHALES IS DECREASING.   (111)
      THE NUMBER OF WHALES CANNOT BE....    (112)
      THERE ARE MEAT, FISH AND VEGETABLES.  (121)
        RETAIN                              (1111)
        SELF-EVIDENT                        (1121)
        SELF-EVIDENT                        (1211)
          IT IS BASED ON A METHOD, A RESULT
AND AN INTERPRETATION.                      (11111)
            SELF-EVIDENT                    (111111)
```

FIG. 4F

| ITEM NUMBER | ANSWER (INPUT STATEMENT) | QUESTION FLAG |
|---|---|---|
| 1 | WHALE HUNTING SHOULD BE STOPPED. | 1 |
| 11 | THERE IS A POSSIBILITY OF THE EXTINCTION OF WHALES. | 1 |
| 12 | THERE IS OTHER FOOD. | 1 |
| 111 | THE NUMBER OF WHALES IS DECREASING. | 1 |
| 112 | THE NUMBER OF WHALES CANNOT BE ARTIFICIALLY INCREASED UNLIKE DOMESTIC ANIMALS. | 1 |
| 121 | THERE ARE MEAT, FISH AND VEGETABLES. | 1 |
| 1111 | RETAIN | 1 |
| 1121 | SELF-EVIDENT | 1 |
| 1211 | SELF-EVIDENT | 1 |
| 11111 | IT IS BASED ON A METHOD, A RESULT AND AN INTERPRETATION. | 1 |
| 111111 | SELF-EVIDENT | 1 |

FIG. 5

```
               DISPLAY OF A LOGICAL STRUCTURE

WHALE HUNTING SHOULD BE STOPPED.                                    (1)
   THERE IS A POSSIBILITY OF THE EXTINCTION OF WHALES.              (11)
      THE NUMBER OF WHALES IS DECREASING.                           (111)
      THE NUMBER OF WHALES CANNOT BE ARTIFICIALLY INCREASED UNLIKE
DOMESTIC ANIMALS.                                                   (112)
      THERE ARE MEAT, FISH AND VEGETABLES.                          (121)
         RETAIN                                                     (1111)
         SELF-EVIDENT                                               (1121)
         SELF-EVIDENT                                               (1211)
            IT IS BASED ON A METHOD, A RESULT AND AN INTERPRETATION.(11111)
               SELF-EVIDENT                                         (111111)

SHOULD A LOGICAL STRUCTURE BE DISPLAYED?      YES    NO
```

F I G. 7 A

```
               DISPLAY OF A LOGICAL STRUCTURE

WHALE HUNTING SHOULD BE STOPPED.                                    (1)
   THERE IS A POSSIBILITY OF THE EXTINCTION OF WHALES.              (11)
      THE NUMBER OF WHALES IS DECREASING.                           (111)
         IT IS BASED ON A METHOD, A RESULT AND AN INTERPRETATION.   (11111)
      THE NUMBER OF WHALES CANNOT BE ARTIFICIALLY INCREASED UNLIKE
DOMESTIC ANIMALS.                                                   (112)
   THERE IS OTHER FOOD.                                             (12)
      THERE ARE MEAT, FISH AND VEGETABLES.                          (121)

SHOULD A LOGICAL STRUCTURE BE DISPLAYED?      YES    NO
```

F I G. 7 B

```
                  DISPLAY OF A PHYSICAL STRUCTURE

WHICH TYPE DO YOU WANT?:   A TOP-CONCLUSION   AN END-CONCLUSION   A BOTH-CONCLUSION
                                  TYPE              TYPE                TYPE
```

FIG. 8A

```
              DISPLAY OF A PHYSICAL STRUCTURE (TOP-CONCLUSION TYPE)

WHALE HUNTING SHOULD BE STOPPED.                                            (1)
   THERE IS A POSSIBILITY OF THE EXTINCTION OF WHALES.                      (11)
      THE NUMBER OF WHALES IS DECREASING.                                   (111)
         IT IS BASED ON A METHOD, A RESULT AND AN INTERPRETATION.           (11111)
      THE NUMBER OF WHALES CANNOT BE ARTIFICIALLY INCREASED UNLIKE
DOMESTIC ANIMALS.                                                           (112)
   THERE IS OTHER FOOD.                                                     (12)
      THERE ARE MEAT, FISH AND VEGETABLES.                                  (121)

SHOULD A PHYSICAL STRUCTURE BE DISPLAYED?       YES     NO
```

FIG. 8B

```
                  DISPLAY OF A PHYSICAL STRUCTURE

WHICH TYPE DO YOU WANT?:   A TOP-CONCLUSION   AN END-CONCLUSION   A BOTH-CONCLUSION
                                 TYPE              TYPE                TYPE
```

FIG. 8C

```
              DISPLAY OF A PHYSICAL STRUCTURE (END-CONCLUSION TYPE)

IT IS BASED ON A METHOD, A RESULT AND AN INTERPRETATION.                    (11111)
   THE NUMBER OF WHALES IS DECREASING.                                      (111)
      THE NUMBER OF WHALES CANNOT BE ARTIFICIALLY INCREASED UNLIKE
DOMESTIC ANIMALS.                                                           (112)
         THERE IS A POSSIBILITY OF THE EXTINCTION OF WHALES.                (11)
         THERE ARE MEAT, FISH AND VEGETABLES.                               (121)
            THERE IS OTHER FOOD.                                            (12)
               WHALE HUNTING SHOULD BE STOPPED.                             (1)

SHOULD A PHYSICAL STRUCTURE BE DISPLAYED?       YES     NO
```

FIG. 8D

```
            DISPLAY OF A PHYSICAL STRUCTURE

WHICH TYPE DO YOU WANT?:  A TOP-CONCLUSION   AN END-CONCLUSION   A BOTH-CONCLUSION
                                TYPE                TYPE                TYPE
```

FIG. 9A

```
            DISPLAY OF A PHYSICAL STRUCTURE (BOTH-CONCLUSION TYPE)

WHALE HUNTING SHOULD BE STOPPED.                                      (00000)
   IT IS BASED ON A METHOD, A RESULT AND AN INTERPRETATION.           (11111)
      THE NUMBER OF WHALES IS DECREASING.                             (111)
      THE NUMBER OF WHALES CANNOT BE ARTIFICIALLY INCREASED UNLIKE
DOMESTIC ANIMALS.                                                     (112)
         THERE IS A POSSIBILITY OF THE EXTINCTION OF WHALES.          (11)
      THERE ARE MEAT, FISH AND VEGETABLES.                            (121)
         THERE IS OTHER FOOD.                                         (12)
            WHALE HUNTING SHOULD BE STOPPED.                          (1)

SHOULD A PHYSICAL STRUCTURE BE DISPLAYED?        YES    NO
```

FIG. 9B

```
              DISPLAY OF A LOGICAL STRUCTURE

WHALE HUNTING SHOULD BE STOPPED.                                      (1)
   THERE IS A POSSIBILITY OF THE EXTINCTION OF WHALES.                (1.1)
      THE NUMBER OF WHALES IS DECREASING.                             (1.1.1)
         METHOD: A SURVEY TARGET, AN AREA, A PERIOD, HOW TO COUNT
         RESULT: TRANSITION IN THE NUMBER OF WHALES
         INTERPRETATION: THE NUMBER OF WHALES CAN BE SAID TO BE DECREASING. (1.1.1.1)
      THE NUMBER OF WHALES CANNOT BE ARTIFICIALLY INCREASED UNLIKE
DOMESTIC ANIMALS.                                                     (1.1.2)
   THERE IS OTHER FOOD.                                               (1.2)
      THERE ARE MEAT, FISH AND VEGETABLES.                            (1.2.1)

DO YOU WANT TO CONFIRM A LOGICAL STRUCTURE?       YES    NO
```

F I G. 1 0 A

CONFIRMATION RESULT OF
A LOGICAL STRUCTURE

IS THERE ANOTHER REASON FOR (1)?
  FOR EXAMPLE: A SACRED ANIMAL, A HIGHLY
INTELLIGENT ANIMAL

IS (1.1.2) CORRECT?
  IF A PROTECTION AREA IS CREATED, THE
NUMBER OF WHALES CAN BE AUTOMATICALLY
INCREASED.

IS (1.1.1) CORRECT?
  THE NUMBER OF MINK WHALES IS
INCREASING.

KEYWORD TABLE

| WORDS AND PHRASES | CORRECT | WRONG |
|---|---|---|
| METHOD, RESULT AND INTERPRETATION | | |
| MAMMAL | | |
| REPRODUCTION | POSSIBLE | IM-POSSIBLE |
| NUMBER OF WHALES | INCREASE | DECREASE |
| WHALES | SACRED | EDIBLE |
| INTELLIGENCE | HIGH | LOW |

F I G. 1 0 B

RELATIONSHIP BETWEEN THE HABITAT AND SIZE OF A BEAR

THE MORE NORTHERN THE HABITAT OF A BEAR, THE LARGER THE BEAR.

RELATIONSHIP BETWEEN THE HABITAT AND WEIGHT OF A BEAR
   IT CAN BE SAID THAT A NORTHERN BEAR WEIGHS MORE THAN A SOUTHERN BEAR.
ACCORDING TO THE DATA OF AN ILLUSTRATED ANIMAL BOOK [1], A WHITE BEAR, A BROWN
BEAR, A BLACK BEAR, A JAPANESE BEAR, A SLOTH BEAR AND A MALAY BEAR, IN THAT ORDER,
DECREASE IN WEIGHT. THAT IS, WEIGHTS OF BEARS DECREASE FROM NORTH TO SOUTH (SEE
BELOW).

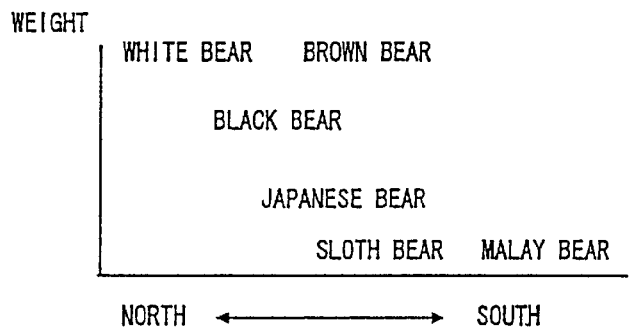

FIG.: HABITAT VS. WEIGHT OF A BEAR

RELATIONSHIP BETWEEN THE HABITAT AND BODY LENGTH OF A BEAR
   IT CAN BE SAID THAT THE BODY OF A NORTHERN BEAR IS LONGER THAN THAT OF A
SOUTHERN BEAR. THE MORE NORTHERN THE HABITAT, THE LOWER THE AMBIENT TEMPERATURE,
ASSUMING THAT THERE IS NO BIG DIFFERENCE IN THE ALTITUDE OF A HABITANT BETWEEN
BEARS. THE LOWER THE AMBIENT TEMPERATURE, THE LONGER THE BODY OF A BEAR.
   ACCORDING TO BERGMAN'S RULE, THE BODY LENGTH OF MAMMALS HAS THE FOLLOWING
RELATIONSHIP [2].
   BODY LENGTH = (SURFACE THERMAL CONDUCTIVITY ÷ AVERAGE THERMAL PRODUCTIVITY)
             × (BODY TEMPERATURE − AMBIENT TEMPERATURE)
A BEAR IS A MAMMAL. IF IT IS ASSUMED THAT THE SURFACE THERMAL CONDUCTIVITY,
AVERAGE THERMAL PRODUCTIVITY AND BODY TEMPERATURE OF BEARS ARE THE SAME REGARDLESS
OF KINDS, THE RELATIONSHIP BETWEEN AMBIENT TEMPERATURE AND BODY TEMPERATURE
BECOMES NEGATIVE.
 REFERENCES
[1] AAA
[2] BBB

FIG. 11

RELATIONSHIP BETWEEN THE HABITAT AND SIZE OF A BEAR

THE FACT THAT THE MORE NORTHERN THE HABITAT OF A BEAR, THE LARGER THE BEAR, IS PROVED BELOW.
RELATIONSHIP BETWEEN THE HABITAT AND WEIGHT OF A BEAR
BASED ON THE DATA OF AN ILLUSTRATED ANIMAL BOOK [1], THE RELATIONSHIP BETWEEN THE HABITAT AND WEIGHT OF EACH OF A WHITE BEAR, A BROWN BEAR, A BLACK BEAR, A JAPANESE BEAR, A SLOTH BEAR AND A MALAY BEAR IS DIAGRAMED. IT CAN BE SAID THAT A NORTHERN BEAR IS HEAVIER THAN A SOUTHERN BEAR, BASED ON THE DIAGRAM BELOW.

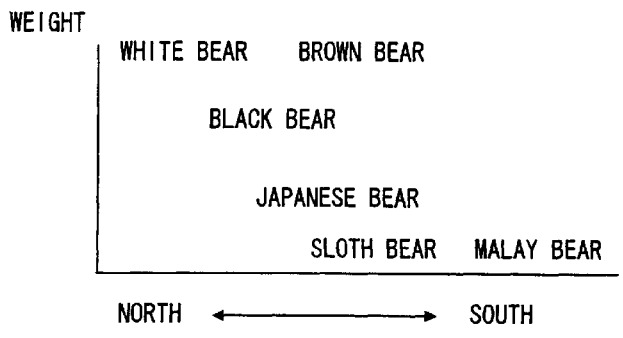

FIG.: HABITAT VS. WEIGHT OF A BEAR

RELATIONSHIP BETWEEN THE HABITAT AND BODY LENGTH OF A BEAR
THE MORE NORTHERN THE HABITAT, THE LOWER THE AMBIENT TEMPERATURE, ASSUMING THAT THERE IS NO BIG DIFFERENCE IN THE ALTITUDE OF A HABITAT BETWEEN BEARS.
ACCORDING TO BERGMAN'S RULE, THE BODY LENGTH OF MAMMALS HAS THE FOLLOWING RELATIONSHIP [2].
BODY LENGTH = (SURFACE THERMAL CONDUCTIVITY ÷ AVERAGE THERMAL PRODUCTIVITY)
× (BODY TEMPERATURE − AMBIENT TEMPERATURE)
A BEAR IS A MAMMAL. IF IT IS ASSUMED THAT THE SURFACE THERMAL CONDUCTIVITY, AVERAGE THERMAL PRODUCTIVITY AND BODY TEMPERATURE OF BEARS ARE THE SAME REGARDLESS OF KINDS, THE RELATIONSHIP BETWEEN AMBIENT TEMPERATURE AND BODY TEMPERATURE BECOMES NEGATIVE.
SINCE THE MORE NORTHERN THE HABITAT OF A BEAR, THE LOWER THE AMBIENT TEMPERATURE, AND THE LOWER THE AMBIENT TEMPERATURE, THE LONGER THE BODY, IT CAN BE SAID THAT THE BODY OF A NORTHERN BEAR IS LONGER THAN THAT OF A SOUTHERN BEAR.
RELATIONSHIP BETWEEN THE HABITAT AND SIZE OF A BEAR
SINCE A NORTHERN BEAR IS HEAVIER AND ITS BODY IS LONGER THAN A SOUTHERN BEAR, IT CAN BE SAID THAT THE MORE NORTHERN THE HABITAT OF A BEAR, THE LARGER THE BEAR.
REFERENCES
[1] AAA
[2] BBB

FIG. 12

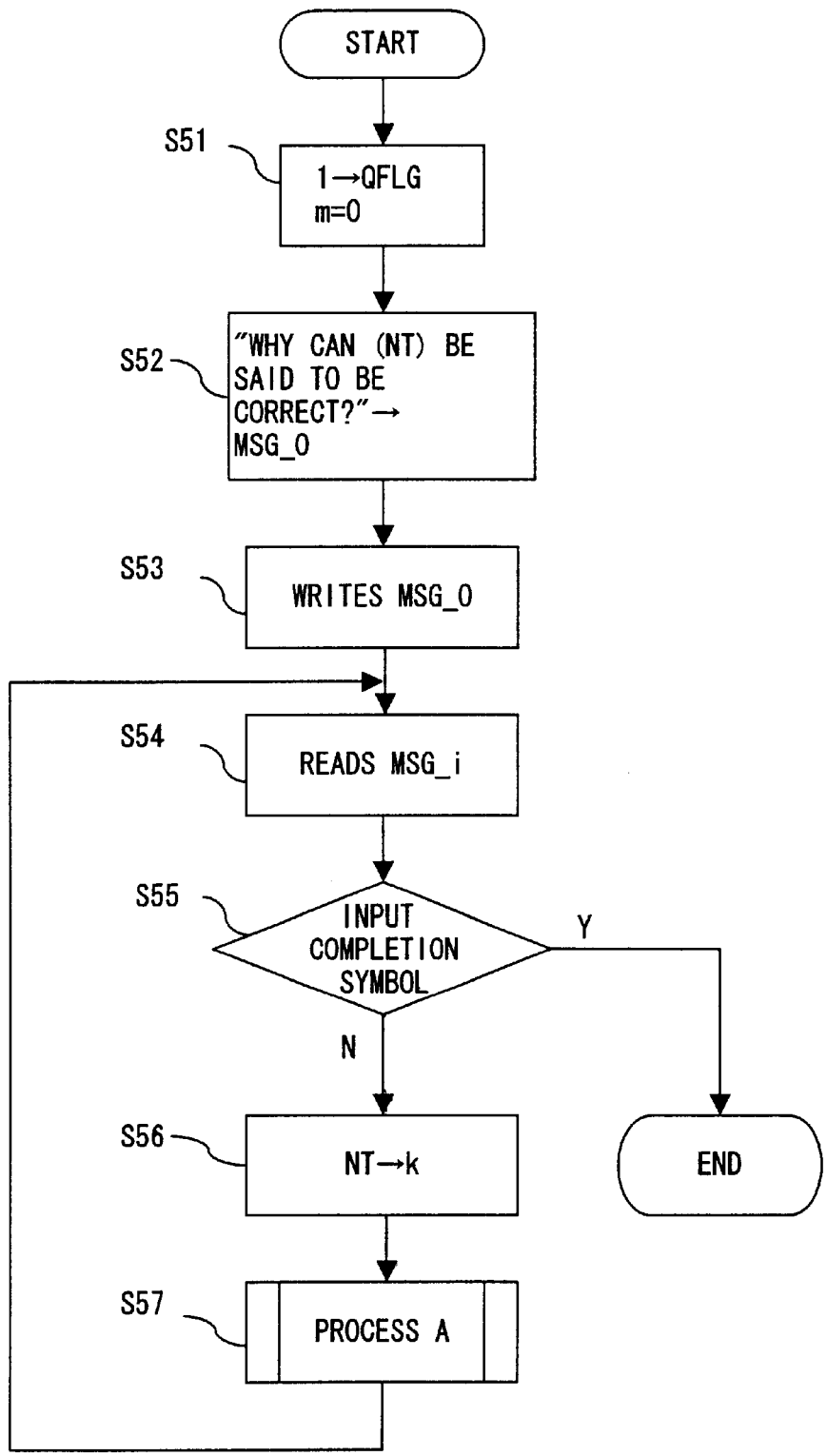
F I G. 16

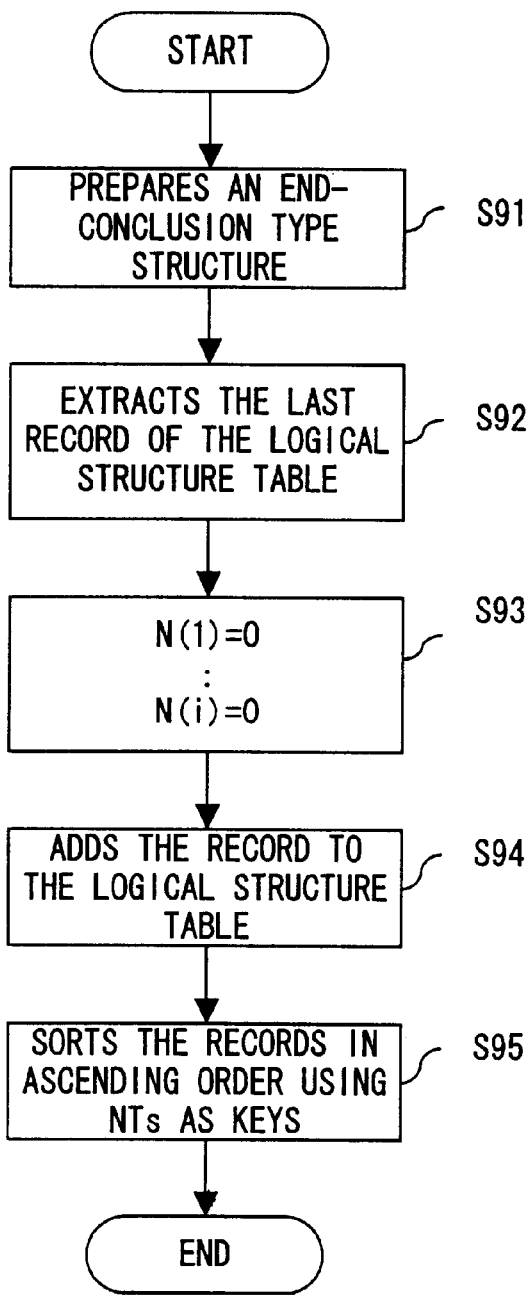
F I G. 2 0

PAPER PREPARATION SUPPORTING METHOD

BACKGROUND OF THE INVENTION

1. Field of the Invention

The present invention relates to a method for supporting the preparation of papers and verifying the prepared papers.

2. Description of the Related Art

Generally speaking, it is not easy to write a sentence, which is easy for a reader to read. In particular, in a paper or report it is difficult to accurately write an assertion (conclusion) and a reason for the assertion without a leap in logic.

If a paper or report is not logically organized, the content will be difficult for a reader to understand. There is a possibility that a paper or report that is not logically organized will not persuade a reader or a reader may misunderstand the paper or report.

Therefore, most writers of papers and reports wish to improve their skill level in writing papers or reports. Thus, there are many publications on how to write a good paper or report and there are also many seminars and schools teaching how to write a good paper or report.

Most parts of the publications on how to write a good paper do not explain the logical structure of a paper and explain only the physical structure. The logical structure of a paper means the correspondence between a conclusion asserted in a paper and the grounds (reason) for the conclusion. The physical structure of a paper means the arrangement or how to arrange each element composing a paper (a verification method, a verification result, an interpretation, a conclusion and the like). For example, the physical structure refers to whether a "conclusion" should be written at the top or at the end.

Although there are many seminars and schools teaching how to write a good paper, there are few tools for a user to easily master how to write a good paper by himself/herself. Furthermore, there are few tools for supporting the preparation of a paper or few tools for verifying a prepared paper. In particular, there is no tool for supporting the preparation of a paper while verifying the logic of the paper.

SUMMARY OF THE INVENTION

It is an object of the present invention to provide a method for supporting the preparation of a paper by judging whether a major reason is present or whether there is a contradiction and by introducing the logical structure of a paper while clarifying the correspondence between a reason and an assertion. It is another object of the present invention to provide a paper preparation supporting method that can be easily used.

The paper preparation supporting method of the present invention comprises: asking a user a question about an assertion of the paper or a reason of the assertion; analyzing an answer from the user to the question; asking a further reason to support the answer if the content of the answer is not judged to be self-evident; preparing a logical structure indicating a logic of the paper in which the assertion and the reason are related according to the answer; and displaying the logical structure.

The logic of a paper is generally composed of an assertion and a reason to support the assertion. Therefore, the logic of a paper can be clarified by collecting the assertion and reason of a paper from a user and visually displaying the assertion and reason. If a reason given by the user is not self-evident, a reason to support the reason is further asked. Therefore, no major reasons are missing in a target paper and there is no leap in logic.

In the method described above, the answers (assertion and reason) can be rearranged according to the arrangement type required by the user and the rearranged result can be displayed. According to this method, the user can freely modify the arrangement of elements composing a paper without changing the logic of the paper.

In the method described above, a hierarchical identification number for relating an answer that triggers a question to a new answer to the question can be attached to each answer and a logic structure can be organized by sorting the answers using the identification numbers as keys. According to this method, the hierarchical relationship between the assertion and reasons of a paper can be easily visualized.

The paper preparation supporting apparatus of the present invention comprises a unit asking a user a question about an assertion of a paper; a unit asking the user a question about a reason to support the assertion made by the user; a unit treating the reason as a new assertion and asking the user a question about a reason to support the new assertion if the reason given by the user is not self-evident; a unit preparing a logical structure indicating a logic of the paper based on the assertion and reason given by the user; and a unit displaying the prepared logical structure.

According to this apparatus, and similar to the method described above, both the lack of major reasons and the leap in logic can be avoided in a target paper.

BRIEF DESCRIPTION OF THE DRAWINGS

FIG. 1 shows the configuration of a system for implementing one embodiment of the paper preparation supporting method of the present invention;

FIGS. 3A through 3H and FIGS. 4A through 4F show screens displayed on a client's display device in interactive processing for preparing the logic structure of a paper;

FIG. 5 shows an example of a logic structure table;

FIGS. 7A and 7B show examples of a logical structure displayed on a client's display device;

FIGS. 8A through 8D show examples of a physical structure (No.1);

FIGS. 9A and 9B show examples of a physical structure (No.2);

FIGS. 10A and 10B explain the process of a logical structure check unit;

FIG. 11 shows an example of a top-conclusion type paper prepared based on a presented physical structure;

FIG. 12 shows an example of a both-conclusion type paper prepared based on a presented physical structure;

FIG. 16 is a flowchart explaining in detail the process B shown in FIG. 13;

FIG. 20 is a flowchart showing the process of preparing a both-conclusion type physical structure;

DESCRIPTION OF THE PREFERRED EMBODIMENTS

The present invention relates to a method for supporting a preparation of a paper. However, a paper described in this specification is not limited to a paper in which a word "paper" is used, and represents a variety of documents with a conclusion to be asserted and a reason to support the conclusion. Specifically, the "paper" is not limited to an academic paper, a corporate paper, a graduation thesis, theses for a variety of examinations, an essay and the like, and also includes a report, a proposal, a manual, an article and the like. Embodiments of the present invention are described below with reference to the drawings.

FIG. 1 shows the configuration of a system for implementing one embodiment of the paper preparation supporting method of the present invention. A server 1 is a server computer, and provides a paper preparation support service. The server 1 comprises a logical structure table 2 and a keyword table 3 in order to provide the paper preparation support service. A client 4 is a computer used by a user to receive the paper preparation support service, and has a function to access the server 1 through a network 5.

In this embodiment, the server 1 provides the paper preparation support service using a Web page. In this case, the network 5 is the Internet. The client 4 is provided with a general browser and receives the paper preparation support service while viewing the Web page provided by the server 1.

Figure 2:
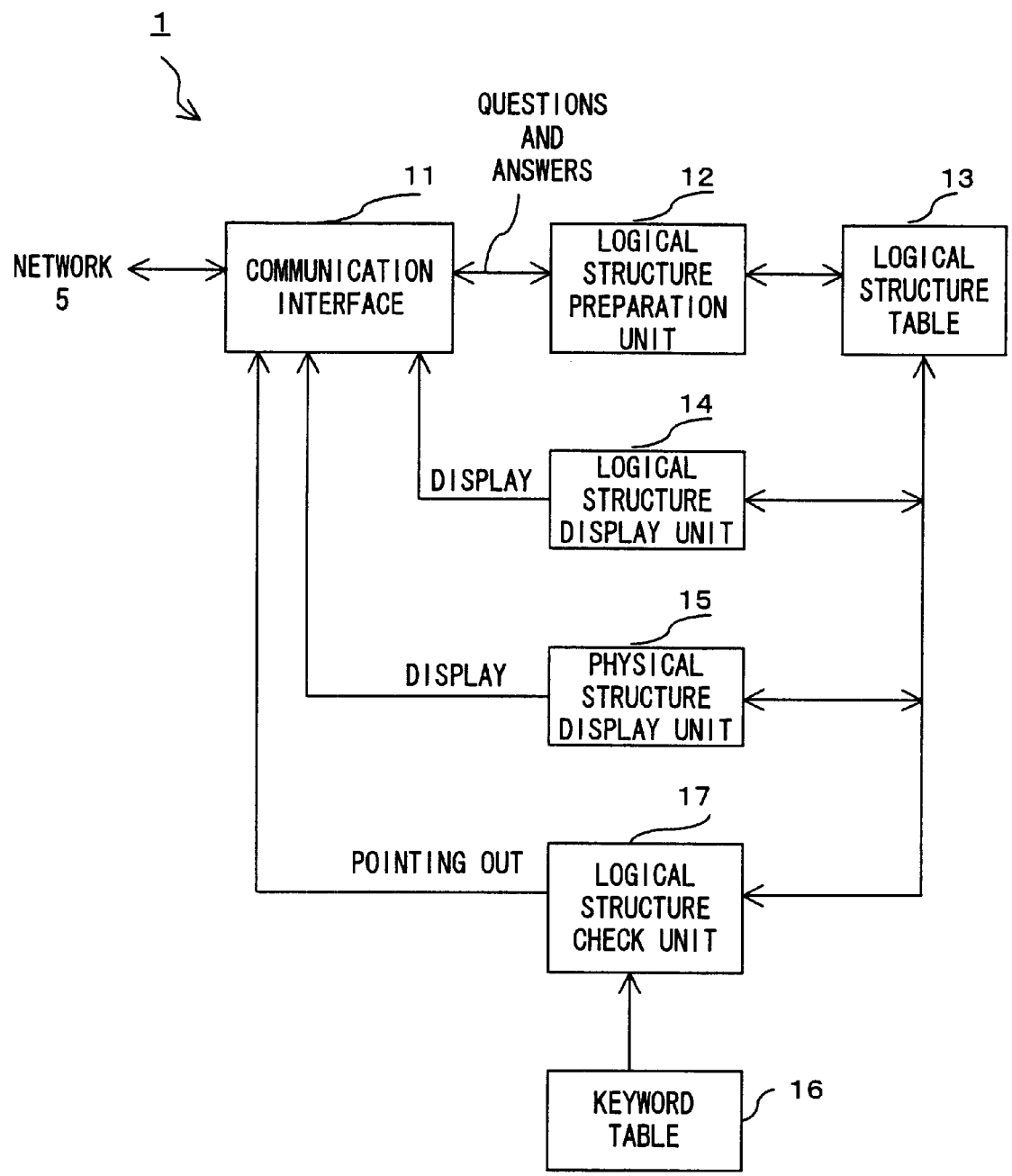
FIG. 2 shows the configuration of a server.

FIG. 2 shows the configuration of the server 1. A communication interface 11 is provided with a function to terminate the access line of the network 5 and is also equipped with a communication protocol (TCP/IP and the like) in order to transmit/receive information or data to/from the client 4.

A logical structure preparation unit 12 asks a user who requests the paper preparation support service (specifically a paper writer) a question about a conclusion to be asserted in a paper and one or more reasons to support the conclusion. Then, the logical structure preparation unit 12 attaches an item number to an answer from the user (conclusion/assertion or reason/grounds) and writes the answer in a logical structure table 13. An "item number" is an identifier or identification number for identifying each answer from a user, and a hierarchical number system is used for it. The hierarchical structure is described later. The logical structure table 13 corresponds to the logical structure table 2 shown in FIG. 1 and manages answers from users using the item numbers attached by the logical structure preparation unit 12.

A logical structure display unit 14 prepares data for indicating the correspondence between a conclusion to be asserted in a paper and reasons to support the conclusion and transmits the data to the client 4 through the communication interface 11. The data for indicating the correspondence can be obtained by arranging the content of the logical structure table 13 based on the item numbers.

A physical structure display unit 15 arranges the content of the logical structure table 13 according to an arrangement type designated by the user and transmits data for indicating the result to the client 4 through the communication interface 11. An arrangement type identifies an arrangement or how to arrange elements composing a paper (a verification method, a verification result, an interpretation, a conclusion and the like). As the arrangement types, the physical structure display unit 15 can provide a "top-conclusion type" describing a conclusion at the top of a paper, an end-conclusion type describing a conclusion at the end and a both-conclusion type describing a conclusion at both the top and end.

A keyword table 16 corresponds to the keyword table 3 shown in FIG. 1 and stores one or a plurality of keywords for each theme of a paper. A logical structure check unit 17 verifies an answer from a user while referring to the keyword table 16 and transmits data for indicating the result to the client 4 through the communication interface 11. For example, the logical structure check unit 17 compares a keyword included in an answer from the user with a keyword stored in the keyword table 16, judges whether a major point at issue is missing in the answer from the user or whether there is contradiction or duplication, corrects the answer from the user if needed, and notifies the user of the result.

The client 4 has a function to notify the server 1 of a user input. For an input device, for example, a keyboard and a mouse are used. The client 4 also has a function to display data transmitted from the server 1. Specifically, a question issued by the logical structure preparation unit 12, a logical structure prepared by the logical structure display unit 14, a physical structure prepared by the physical structure display unit 15 and a verification result (correction result) prepared by the logical structure check unit 17 are displayed on the display device of the client 4. Then, the user can receive the paper preparation support service by interaction with the server 1 based on the displays.

Although in this embodiment, it is assumed that a user receives a paper preparation support service by accessing the server 1 using the client 4 in a client-server system, the user can also receive the same service in a stand-alone environment. Specifically, if a user computer is provided with a logical structure preparation unit 12, a logical structure table 13, a logical structure display unit 14, a physical structure display unit 15, a keyword table 16 and a logical structure check unit 17, the user can receive the same service in a stand-alone environment. In this case, the user computer must be provided with an input device, such as a keyboard, a mouse and the like and a display device for displaying data instead of the communication interface shown in FIG. 2.

Next, before the detailed description of the embodiments is given, the logical structure of a paper is described. Specifically, the correspondence between a conclusion to be asserted in a paper and grounds (reasons) to support the conclusion is described.

In a paper, generally, not only a conclusion to be asserted, but also grounds (reasons) to support the conclusion must be described. However, if it cannot be judged whether the grounds to support the conclusion are correct, the conclusion cannot be verified. Therefore, even in a case where the grounds to support the conclusion are described, if the grounds are vague, additional grounds to further support the grounds must be described. That is to say, the grounds to support a conclusion must be investigated so that the grounds may be self-evident. To be "self-evident" means to be admitted to be correct without being verified, and assumes a fact or a hypothesis. A "fact" includes an experience, statistics, a speech, a document and the like. A "hypothesis" includes a law, a rule, an assumption and the like. It is assumed that a hypothesis induced from a fact called a law or a theory is regarded as correct knowledge. It is also assumed that rules, such as a mathematical axiom, traffic rules and the like are correct. Furthermore, it is assumed that a hypothesis is a correct assumption.

The logic of a paper is composed of an assertion (conclusion) and reasons (grounds). A reason is grounds to support an assertion, and specifically, is an answer to a question "Why can the assertion be said to be correct?" However, if a reason to support a specific assertion is not self-evident, the reason can be a new assertion. For example, it is assumed that the conclusion of a paper with a theme "Should whale hunting be continued or stopped?" is "Whale hunting should be stopped" and a reason to support the conclusion is "There is a possibility of the extinction of whales". In this case, a statement "There is a possibility of the extinction of whales" is a reason for the assertion "Whale hunting should be stopped" and is also one assertion itself. Therefore, if the reason "There is a possibility of extinction of whales" is not self-evident in this paper, a reason to support it must be searched for. Specifically, for example, survey data and the like to support the possibility of the extinction should be prepared.

In this way, the logic of a paper is organized by hierarchically combining an assertion and reasons. An assertion on the highest-ranking level of this hierarchical structure is the conclusion of a paper.

Next, the embodiments of the paper preparation support service are described in detail. It is assumed that a user (a writer of a paper) receives a paper preparation support service by accessing the server 1 using the client 4. It is also assumed that the theme of a paper is "Should whale hunting be continued or stopped?". Examples are described in detail below with reference to data displayed on the display device of the client 4.

First, the display device of the client 4 displays a question used for a user to input the conclusion of a paper, as shown in FIG. 3A.

It is assumed that the user inputs an answer shown in FIG. 3B in response to the question shown in FIG. 3A. In this example, "Whale hunting should be stopped" is a conclusion of this paper. "/e" is a temporary completion symbol and indicates that the input of one answer is completed in response to a question. Therefore, if a plurality of answers is inputted in response to one question, this temporary completion symbol plays a role of separating the plurality of answers from one another. "//e" is an input completion symbol and indicates that all inputs are completed in response to a question.

The answer inputted by the user is transmitted to the server 1 through the network 5. Then, the logical structure preparation unit 12 of the server 1 attaches an item number to the answer from the user and stores the answer in the logical structure table 13. Since in this example, this answer is an assertion (conclusion) on the highest-ranking level, "1" is attached as an item number. The logical structure preparation unit 12 asks the user for a reason to support the assertion inputted by the user in FIG. 3B. Specifically, as shown in FIG. 3C, the logical structure preparation unit 12 displays a question sentence for the user to input a reason to support the assertion on the display device of the client 4. Here, both of the answer previously inputted by the user with the item number and the question sentence asking for the reason are displayed on the display device of the client 4.

It is assumed that the user inputs answers shown in FIG. 3D in response to the question sentence shown in FIG. 3C. Here, the user presents two reasons in response to the question sentence shown in FIG. 3C. Then, these reasons are transmitted to the server 1 through the network 5.

When the server 1 receives the answers from the user, the logical structure preparation unit 12 attaches an item number to each of the reasons inputted by the user and stores the answers in the logical structure table 13. In this case, the reasons inputted in FIG. 3D are the answers to the assertion inputted in FIG. 3B. Therefore, item numbers attached to these reasons are dependent upon the item number attached to the assertion inputted in FIG. 3B. In this example, "11" and "12" are attached to these reasons.

Then, the logical structure preparation unit 12 asks the user for a reason to support each of the reasons inputted in FIG. 3D, as shown in FIGS. 3E through 3H. Then, the logical structure preparation unit 12 attaches an item number to each of the reasons and stores the answers in the logical structure table 13. In this example, as reasons to support "There is a possibility of the extinction of whales (11)", the statements "The number of whales is decreasing" and "The number of whales cannot be artificially increased unlike domestic animals" are inputted, and "111" and "112" are respectively attached to the statements as item numbers dependent upon "11". As a reason to support "There is other food (12)", a statement "There are meat, fish and vegetables" is inputted and "121" is attached to the statement as an item number dependent upon "12".

Furthermore, the logical structure preparation unit 12 asks the user for a reason to support each of the reasons inputted by the user in FIGS. 3E through 3H. In FIG. 4A, first, the logical structure preparation unit 12 asks for grounds to support "The number of whales is decreasing (111)". Then, the user retains an answer to this question. Although in this example, the user inputs a statement "retain", this is one example. Alternatively, a retain button can be provided in advance and the user can push this button, if the user wants to retain an answer to a question. The same description can apply to the case where a reason is "self-evident".

Upon detecting that an answer to a question is "retain", the logical structure preparation unit 12 attaches an item number to the answer and stores the answer in the logical structure table 13. Specifically, the logical structure preparation unit 12 attaches an item number "1111" that is dependent upon the item number attached to the "The number of whales is decreasing (111)" in response to the "retain".

In FIG. 4B, a reason to support "The number of whales cannot be artificially increased unlike domestic animals (112)" is asked. Then, the user replies that the reason is "self-evident".

When detecting that the answer to the question is "self-evident", the logical structure preparation unit 12 attaches an item number to the answer and stores the answer in the logical structure table 13. Specifically, the logical structure preparation unit 12 attaches an item number "1121" that is dependent upon the item number attached to "The number of whales cannot be artificially increased unlike domestic animals (112)", to this "self-evident". Then, the logical structure preparation unit 12 stops asking for a further reason to support the statement. Specifically, in this example, a reason to support "The number of whales cannot be artificially increased unlike domestic animals (112)" is not asked for.

Similarly, as shown in FIGS. 4O through 4F, the logical structure preparation unit 12 repeats a question to the user until the user inputs a statement "self-evident" as a reason to support each assertion. As shown in FIG. 4D, the logical structure preparation unit 12 issues a question which the user has retained an answer again, after it receives an answer to another question from the user.

In this way, the logical structure preparation unit 12 asks a user for information about the logic of a paper and prepares a logical structure table 13 based on an answer to the question. FIG. 5 shows a logical structure table 13 prepared based on the user's inputs shown in FIGS. 3 and 4. In the logical structure table 13 shown in FIG. 5, an "answer" is data (mainly a character string) inputted by the user. An "item number" is an identification number attached to an answer from the user by the logical structure preparation unit 12. Furthermore, a "question flag" indicates whether the logical structure preparation unit 12 asks the user for a reason to support an answer from the user. Upon receipt of an answer from a user, the logical structure preparation unit 12 sets "1" in the "question flag" if the answer is "self-evident". By If the answer is other than "self-evident", "0" is set in the question flag. If the logical structure preparation unit 12 asks a user a question "Why can the answer be said to be correct?" then the question flag is updated from "0" to "1". FIG. 5 shows a state where questions are made to all answers.

Figure 6:
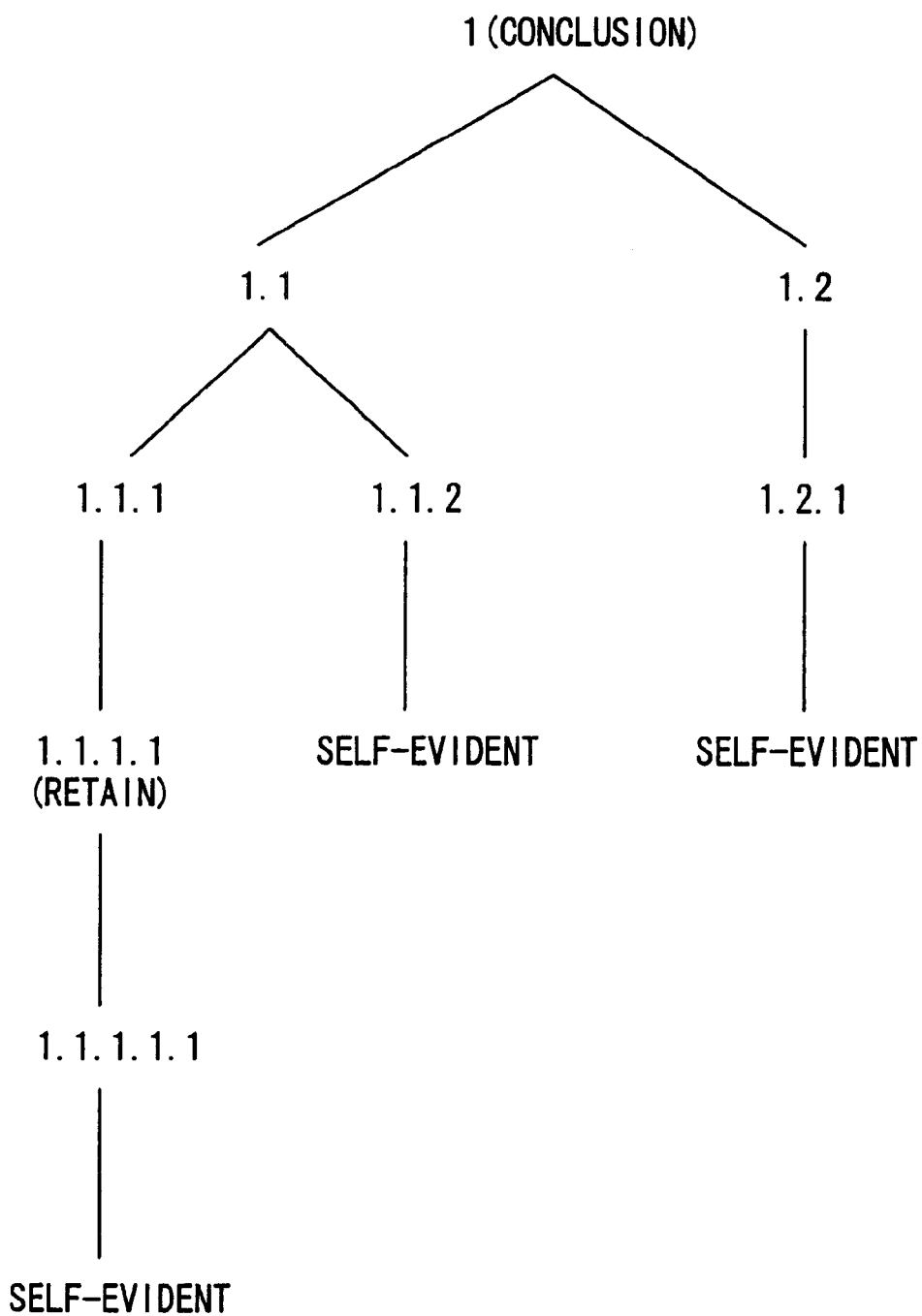
FIG. 6 shows the hierarchical structure of answers inputted by a user.

FIG. 6 shows the hierarchical structure of answers inputted by the user in FIGS. 3 and 4. In this example, a hierarchical structure is generated using an item number attached to each answer. This hierarchical structure is organized based on the dependent relationship between an "assertion" and a "reason".

If the logical structure table 13 is completed, as shown in FIG. 7A, the logical structure display unit 14 makes an inquiry to the user as to whether the logical structure of a paper should be displayed. At this moment, answers inputted by the user are displayed on the display device of the client 4 in input order.

If the user inputs an instruction to display the logical structure of the paper, the logical structure display unit 14 extracts data stored in the logical structure table 13 and deletes records corresponding to "self-evident" and "retain" from the data. Then, the logical structure preparation unit 14 performs an item number conversion process, which is described later, for the remaining records and sorts the records in ascending order of item numbers using item numbers as keys. Then, the logical structure preparation unit 14 displays the sorting result on the display device of the client 4 as the logical structure of the paper. FIG. 7B shows an example of a logical structure displayed on the display device of the client 4.

A logical structure visually displays the hierarchical relationship of the logic of a paper. In this example, answers on the same level are displayed with the same indentation on the screen. Specifically, this logical structure shows that the conclusion of the paper is "Whale hunting should be stopped" and that the major reasons to support the conclusion are "There is a possibility of the extinction of whales" and "There is other food". The logical structure shows that reasons to support "There is a possibility of the extinction of whales" are "The number of whales is decreasing" and "The number of whales cannot be artificially increased unlike domestic animals", that a reason to support "The number of whales is decreasing" is "It is based on a method (a survey target, an area a period, how to count)" and that a reason to support "There is other food" is "There is meat, fish and vegetables".

The procedure of preparing a logical structure to be displayed based on the logical structure table 13 is as follows. Specifically, first, in the logical structure table 13, the number of digits of the item number of each record is unified by attaching "0", as required. One example is shown below.

```
Whale hunting should be stopped (1)
There is a possibility of the extinction of whales
    (11)
    There is other food (12)
    The number of whales is decreasing (111)
    The number of whales cannot be artificially
increased unlike domestic animals (112)
    There is meat, fish and vegetables (121)
    It is based on a method, a result and an
interpretation (11111)
        ↓
Whale hunting should be stopped         (10000)
    There is a possibility of the
                    extinction of whales   (11000)
    There is other food                    (12000)
    The number of whales is decreasing     (11100)
    The number of whales cannot be
        artificially increased unlike
                        domestic animals   (11200)
    There is meat, fish and vegetables     (12100)
    It is based on a method, a result
                    and an interpretation  (11111)
Then, the records are sorted in ascending order
of item numbers with the unified number of digits. The
sorting result is as follows.
    Whale hunting should be stopped        (10000)
    There is a possibility of the
                    extinction of whales   (11000)
    The number of whales is decreasing     (11100)
    It is based on a method, a result
                    and an interpretation  (11111)
    The number of whales cannot be
        artificially increased unlike
                        domestic animals   (11200)
    There is other food                    (12000)
    There is meat, fish and vegetables     (12100)
```

Furthermore, when the records are displayed on the display of the client 4, as shown below, the display starting position of each line is determined depending on the number "0" added to each item number. In this case, "0" can also be deleted.

```
Whale hunting should be stopped             (1)
    There is a possibility of ...           (11)
        The number of whales is decreasing  (111)
            It is based on a method, ...    (11111)
        The number of whales cannot be ...  (112)
    There is other food                     (12)
        There is meat, fish and vegetables  (121)
```

Thus, a user can obtain the logical structure of a paper by replying to questions posed by the server 1. In this case, a logical structure obtained thus is invariable as long as neither the content of an assertion nor the reasons change. However, even if the logical structure is the same, there are many ways of writing a paper. That is to say, reasons to support an assertion can be given after the assertion is made at the top of the paper or an assertion can be made after reasons to support the assertion are given. This difference is basically due to the arrangement of the elements (assertion and reasons) of a paper. In other words, in a case where an arrangement of the elements of a paper is modified, if the logical structure is the same, the logic of the paper does not change. In this specification, the arrangement of the elements (assertion and reason) of a paper is called a "physical structure".

The service of this embodiment provides a function to display a physical structure designated by a user. In this service, the user requests the display of the physical structure and also designates an "arrangement type" on the screen shown in FIG. 8A.

If the user designates an arrangement type, the physical structure display unit 15 arranges data stored in the logical structure table 13 according to the designated arrangement type and displays the result on the display device of the client 4. FIG. 8B shows an example of a top-conclusion type physical structure. The top-conclusion type physical structure is created basically the same method as for preparing a logical structure.

FIGS. 8C and 8D show an example of an end-conclusion type physical structure. The end-conclusion type physical structure is prepared in the following procedure. First, the number of digits of the item number of each record is unified in the logical structure table 13 by replacing "0" in the item number of a logical structure with "blank". One example is shown below. In this example, "blank" is expressed by a mark □.

| | |
|---|---|
| Whale hunting should be stopped | (10000) |
| There is a possibility of the extinction of whales | (11000) |
| The number of whales is decreasing | (11100) |
| It is based on a method, a result and an interpretation | (11111) |
| The number of whales cannot be artificially increased unlike domestic animals | (11200) |
| There is other food | (12000) |
| There is meat, fish and vegetables | (12100) |
| ↓ | |
| Whale hunting should be stopped | (1□□□□) |
| There is a possibility of the extinction of whales | (11□□□) |
| The number of whales is decreasing | (111□□) |
| It is based on a method, a result and an interpretation | (11111) |
| The number of whales cannot be artificially increased unlike domestic animals | (112□□) |
| There is other food | (12□□□) |
| There is meat, fish and vegetables | (121□□) |

Then, the records are sorted in ascending order using item numbers, the digits of which are unified, as keys. In this case "blank" is treated to be greater in value than any "numeric number". For example, "1□□□□" is treated to be greater in value than "11□□□". The sorting result is as follows.

| | |
|---|---|
| It is based on a method, a result and an interpretation | (11111) |
| The number of whales is decreasing | (111□□) |
| The number of whales cannot be artificially increased unlike domestic animals | (112□□) |
| There is a possibility of the extinction of whales | (11□□□) |
| There is meat, fish and vegetables | (121□□) |
| There is other food | (12□□□) |
| Whale hunting should be stopped | (1□□□□) |

Furthermore, when the records are displayed on the display device of the client 4, as shown below, the display starting position of each line is determined based on the number of "blank" marks attached to each item number.

| | |
|---|---|
| It is based on a method, ... | (11111) |
| The number of whales is decreasing | (111) |
| The number of whales cannot be ... | (112) |
| There is a possibility of ... | (11) |
| There is meat, fish and vegetables | (121) |
| There is other food | (12) |
| Whale hunting should be stopped | (1) |

FIGS. 9A and 9B show an example of a physical structure in a both-conclusion type. A both-conclusion type physical structure can be obtained by adding a "conclusion" to the top of the end-conclusion type physical structure. The conclusion added to the top is assigned an item number with "0" in all digit.

FIGS. 10A and 10B explain the process of the logical structure check unit 17. When the logical structure of a paper is displayed on the display device of the client 4, as shown in FIG. 10A, the logical structure check unit 17 makes an inquiry to the user as to whether the logical structure should be checked/corrected. If the user requests a check/correct of a logical structure, the logical structure check unit 17 checks the logical structure using the keyword table 16.

The keyword table 16 stores one or a plurality of keywords for each paper theme. In this example, the words "animal", "intelligence", "mammal" and the like are stored as the keywords of a word "whale". Furthermore, if each keyword is provided with "correct" and "wrong", sub-keywords are registered for the keyword.

Then, the logical structure check unit 17 judges whether there is a word that is stored in the keyword table 16 but not stored in the logical structure table 13. If there is such a word, the logical structure check unit 17 displays that keyword on the display device of the client 4. In the example shown in FIG. 10B, it is taught that "sacred animal", "highly intelligent animal" should be considered to be another reason to support an assertion "Whale hunting should be stopped". Thus, the user can check that no major keyword is missing in his/her logic.

The logical structure check unit 17 detects a contradiction between a word stored in the logical structure table 13 and a keyword registered in the keyword table 16. In the example shown in FIG. 10B, there is a phrase "number of whales" in an answer from the user, and the same phrase is stored in the keyword table 16. In this case, a sub-key word is judged. Here, "increase" is registered as a sub-keyword for "number of whales". On the other hand, decreasing is used immediately after "number of whales" in the answer from the user. Thus, it is judged that there is a possibility that the user's answer may be wrong. As a result, a different opinion is introduced to the user for the phrase "number of whales". The same description also applies to other phrases. Thus, the user can become aware of the contradiction in his/her logic or another opinion.

An example of a paper preparation service of this embodiment is shown below.

EXAMPLE 1

Question: Is a northern bear larger than a southern bear?

Answer: The more northern the habitat of a bear, the larger the bear. (Conclusion)

Major reasons to support the conclusion are "The more northern the habitat of a bear, the heavier the bear" and "The more northern the habitat of a bear, the longer the bear". However, since these reasons are not necessarily self-evident, reasons to further support them are needed. Then, the following logical structure will be prepared by repeatedly asking a user questions until self-evident reasons can be obtained.

---

The more northern the habitat of a bear, the larger the bear (1)
    The more northern the habitat of a bear, the heavier the bear (11)
        Fact including survey result of the relationship between the habitat and weight of a bear (111)
    The more northern the habitat of a bear, the longer the bear (12)
        The more northern a habitat, the lower the ambient temperature (121)
            There is no big difference in the habitat altitude between bears (1211)
            The lower the ambient temperature, the longer a bear (122)
Bergman's rule (1221)
A bear is a mammal (1222)
There is an inverse relationship between ambient temperature and the length of a bear (1223)
    It is assumed that the surface thermal conductivity, average thermal productivity and body temperature between bears are the same (12231)

---

The survey result described above shows the relationship between the habitat of a white bear, a bear, a black bear, a Japanese bear, a sloth bear and a Malay bear, and their respective weights. According to Bergman's rule, in a mammal, the relationship "Body length=(Surface thermal conductivity/Average thermal productivity)×(Body temperature−Ambient temperature)" holds true. A statement "A bear is a mammal" is public knowledge and a statement "There is no big difference in altitude between bears" is a hypothesis.

An end-conclusion type physical structure is prepared based on the logical structure described above as follows.

---

Fact including survey result of the relationship between the habitat and weight of a bear
            The more northern the habitat of a bear, the longer the bear
    There is no big difference in the altitude of a habitat between bears
        The more northern the habitat of a bear, the lower ambient temperature
Bergman's rule
A bear is a mammal
It is assumed that the surface thermal conductivity, average thermal productivity and body temperature between bears are the same
    There is an inverse relationship between ambient temperature and the length of a bear
        The lower ambient temperature, the longer a bear
            The more northern the habitat of a bear, the longer the bear
                The more northern the habitat of a bear, the larger the bear (conclusion)

---

A both-conclusion type physical structure is prepared based on the logical structure described above as follows.

---

The more northern the habit of a bear, the larger the bear (conclusion)
    Fact including survey result of the relationship between the habitat and weight of a bear
        The more northern the habitat of a bear, the longer the bear
    There is no big difference in the altitude of a habitat between bears
        The more northern the habitat of a bear, the lower ambient temperature
Bergman's rule
A bear is a mammal
It is assumed that the surface thermal conductivity, average thermal productivity and body temperature between bears are the same
    There is an inverse relationship between ambient temperature and the length of a bear
        The lower ambient temperature, the longer a bear
            The more northern the habitat of a bear, the longer the bear
                The more northern the habitat of a bear, the larger the bear (conclusion)

---

Since a top-conclusion type physical structure is basically the same as the logical structure, the description is omitted.

A user can easily prepare a paper based on a displayed physical structure. Specifically, a paper can be prepared by adding the title of a paper, the headings of items, references and the like to the physical structure and also by connecting elements with appropriate words and phrases. FIG. 11 shows an example of a top-conclusion type paper, and FIG. 12 shows an example of a both-conclusion type paper.

EXAMPLE 2

Theme: Side length of a right triangle

First, examples of questions from the logical structure preparation unit 12 of the server 1 and user's answers to the questions are shown.

Question: What is your conclusion?

Answer: If the three side lengths of a right triangle are assumed to be a, b and c (oblique side), relationship "a×a+b×b=c×c holds true. (1)

Q: Why can (1) be said to be correct?

A: It can be proved. (1.1)

It can be verified. (1.2)

Q: Why can (1.1) be said to be correct?

A: A square is obliquely disposed inside a square. However, each vertex of the inner square is disposed in such a way to touch each side of the outer square. Thus, four right triangles are formed. If the lengths of the three sides of each right triangle are assumed to be a, b and c (oblique side), "(a+b)×(a+b)=c×c+(ab/2)×4" since "The area of the outer square=the area of the inner square+the areas of four right triangles". Thus, relationship "a×a+b×b=c×c is obtained.

Q: Why can (1.2) be said to be correct?

A: For example, each of the triangles with three side lengths (3, 4, 5), (5, 12, 13) and (8, 15, 17) is a right triangle. In this case, the following equations retain true.

$$3 \times 3 + 4 \times 4 = 5 \times 5$$

$$5 \times 5 + 12 \times 12 = 13 \times 13$$

$$8 \times 8 + 15 \times 15 = 17 \times 17 \qquad (1.2.1)$$

Q: Why can (1.2.1) be said to be correct?

A: Method: Each triangle is drawn using a compass and a ruler, and each angle is measured using a protractor.

Result: Each triangle has a right angle.

Interpretation: Each triangle can be said to be a right triangle.

Based on the answers to the questions described above, the following logical structure is prepared by the logical structure preparation unit 12.

If the three side lengths of a right triangle are assumed to be a, b and c (oblique side), relationship "a×a+b×b=c×c" holds true.

It can be proved.

A square is obliquely disposed inside a square. Also, each vertex of the inner square is disposed in such a way to touch each side of the outer square. Thus, four right triangles are formed. If the lengths of the three sides of each right triangle are assumed to be a, b and c (oblique side), "(a+b)×(a+b)=c×c+(ab/2)×4" since "The area of the outer square=the area of the inner square+the areas of four right triangles". Thus, relationship "a×a+b×b= c×c" is obtained.

It can be verified.

For example, each of the triangles with three side lengths (3, 4, 5), (5, 12, 13) and (8, 15, 17) is a right triangle.

Method: Each triangle is drawn using a compass and a ruler, and each angle is measured using a protractor.

Result: Each triangle has a right angle.

Interpretation: Each triangle can be said to be a right triangle.

The following equations can be obtained.

$$3 \times 3 + 4 \times 4 = 5 \times 5$$

$$5 \times 5 + 12 \times 12 = 13 \times 13$$

$$8 \times 8 + 15 \times 15 = 17 \times 17$$

Next, the operation of the server 1 is described with reference to a flowchart.

Figure 13:
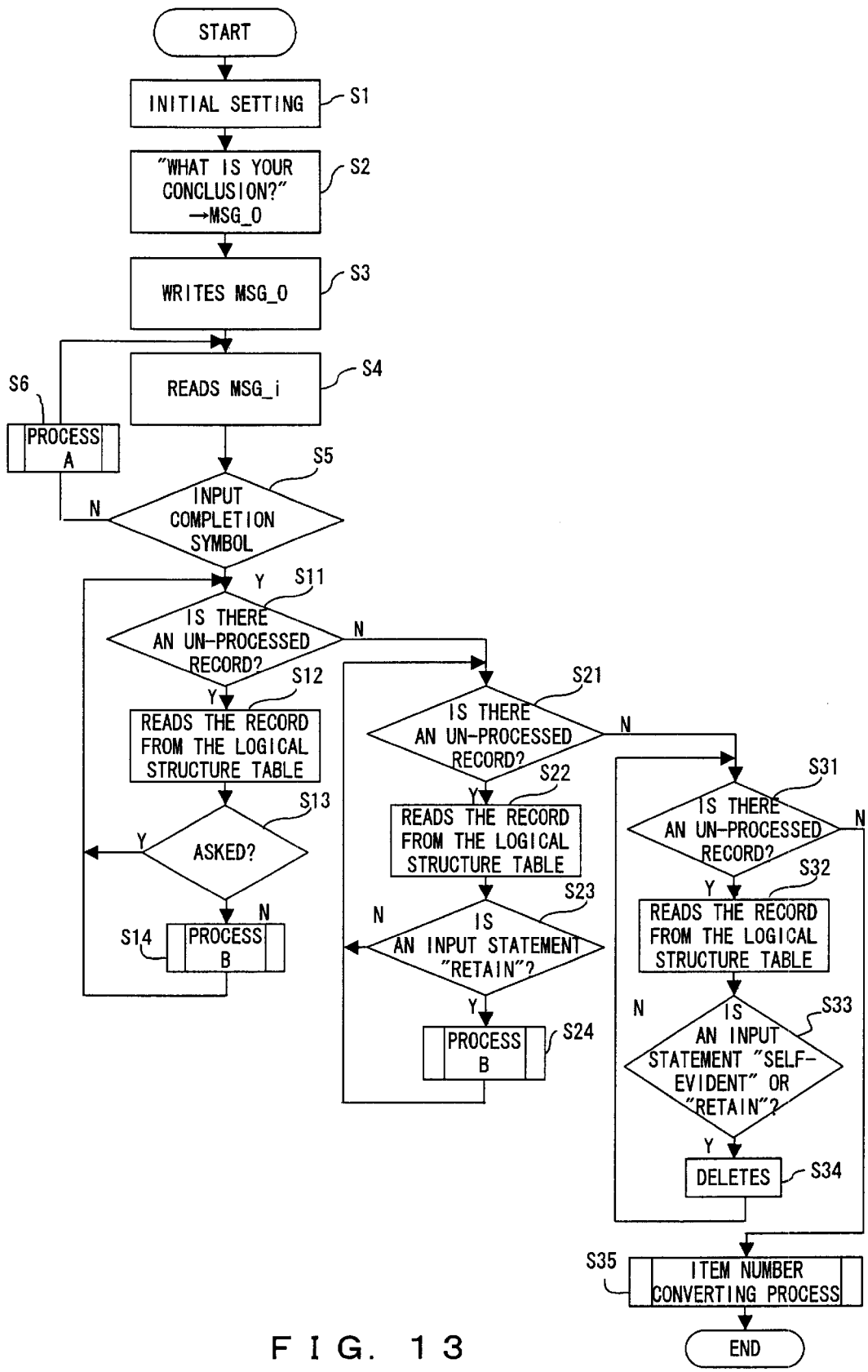
FIG. 13 is a flowchart explaining the operation of the logic structure preparation unit.

FIG. 13 is a flowchart explaining the operation of the logical structure preparation unit 12. The process in this flowchart is performed when a request to receive a paper preparation support service is issued from a user. In the following description, a statement to be displayed on the display device of the client 4 and a statement inputted by the user through the client 4 are called "display statement (MSG-O)" and an "input statement (MSG-i)", respectively.

In step S1, a variety of variables is initialized. Specifically, for each of the variables (k, m) for generating an item number to be attached to a statement inputted by the user, "0" is set.

In steps S2 and S3, as a display statement, a statement "What is the conclusion?" is outputted. In the server/client system as shown in FIG. 1, the display statement is outputted to the client 4. Thus, this statement is displayed on the display device of the client 4. Then, the user inputs an answer to this display statement. In this case, the answer of the user is the conclusion of the paper.

In step S4, the input statement transmitted from the client 4 is received. This input statement is an answer to the display statement in steps S2 and S3 and is the conclusion of the paper. In step S5, the input statement is analyzed. If an input completion symbol (//e) is detected, the flow proceeds to step S11. Otherwise, the flow proceeds to step S6.

One example is shown. In this example it is a assumed that the following input statement is received.

Whale hunting should be stopped.

/e

//e

In this case, when the statement "Whale hunting should be stopped" is received, a process in step S6 is performed. Then, when "/e (temporary completion symbol)" is received, the process in step S6 is performed again. Then, when "//e (input completion symbol)" is received, the flow proceeds to step S11.

Step S6, which is described in detail later, includes a process of attaching an item number to an input statement and a process of writing the input statement in the logical structure table 13.

In steps S11 through S14, a reason to support the conclusion inputted by the user is asked. If the grounds are not self-evident, a question is further asked and a logical structure table 13 is prepared based on the answers to the questions. Specifically, the process is as follows.

Step S11 is used to perform the processes in steps S12 through S14 for each record of the logical structure table 13. In step S12, an un-processed record is extracted from the logical structure table 13. In step S13, it is judged whether a reason to support the statement stored in the record extracted in step S12 is asked. If the question is not issued, the flow proceeds to step S14. If the question is already issued, the flow returns to step S11. In this judgment, the question flag (QFLG) shown in FIG. 5 is referenced. Step S14 includes processes of issuing a question to a user, attaching an item number to an answer to the issued question and writing the answer in the logical structure table 13.

Steps S21 through S24 are used to issue the question again, if there is a question whose answer has been retained by the user. Specifically, the process is as follows.

Step S21 is used to perform the processes in steps S22 through S24 for each record of the logical structure table 13. In step S22, an un-processed record is extracted from the logical structure table 13. In step S23, it is judged whether a retained statement is stored in the record extracted in step S12. If the retained statement is stored, the flow proceeds to step S14. Otherwise, the flow returns to step S21. Step S24 is the same process as step S14.

Steps S31 through S34 are processes for deleting a record in which a statement "self-evident" or "retain" is written. Specifically, the process is as follows.

Step S31 is used to perform the processes in steps S32 through S34 for each record of the logical structure table 13. In step S32, an un-processed record is extracted from the logical structure table 13. In step S33, it is judged whether a statement "self-evident" or "retained" is written in the record extracted in step S12. If a statement "self-evident" or "retain" is written, then in step S34, a corresponding record is deleted. Otherwise, the flow returns to step S31.

If the processes in steps S32 through S34 are performed for each record of the logical structure table 13, then in step S35, an item number converting process is performed. The item number converting process is described in detail later.

As described above, the logical structure preparation unit 12 issues questions to a user and prepares a logical structure table 13 based on the answers to the questions.

Figure 15:
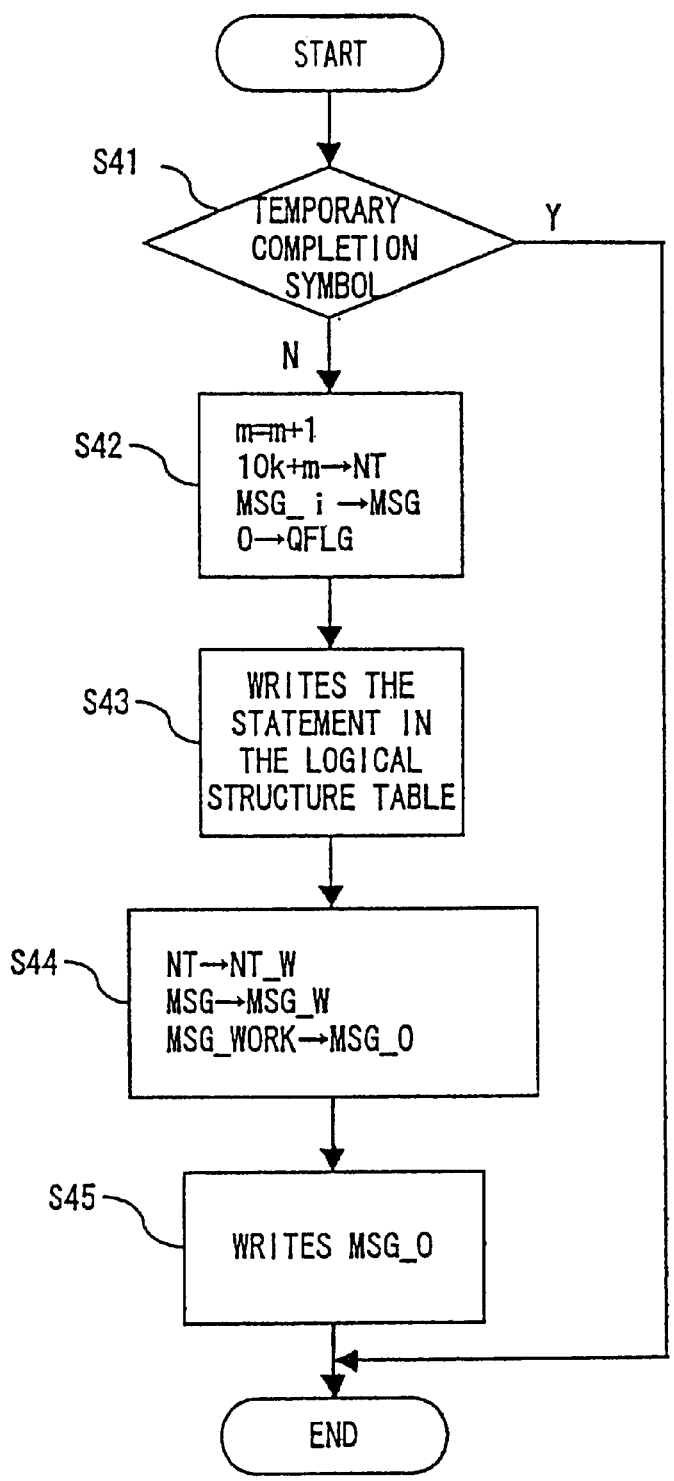
FIG. 15 is a flowchart explaining in detail the process A shown in FIG. 13.

FIG. 15 is a flowchart explaining in detail the process A shown in FIG. 13. This process is performed when a user inputs a "conclusion".

In step S41, it is judged whether a temporary completion symbol (/e) is detected. If the temporary completion symbol is not detected, steps S42 through S45 are performed. If the symbol is detected, the process terminates.

Figure 14:
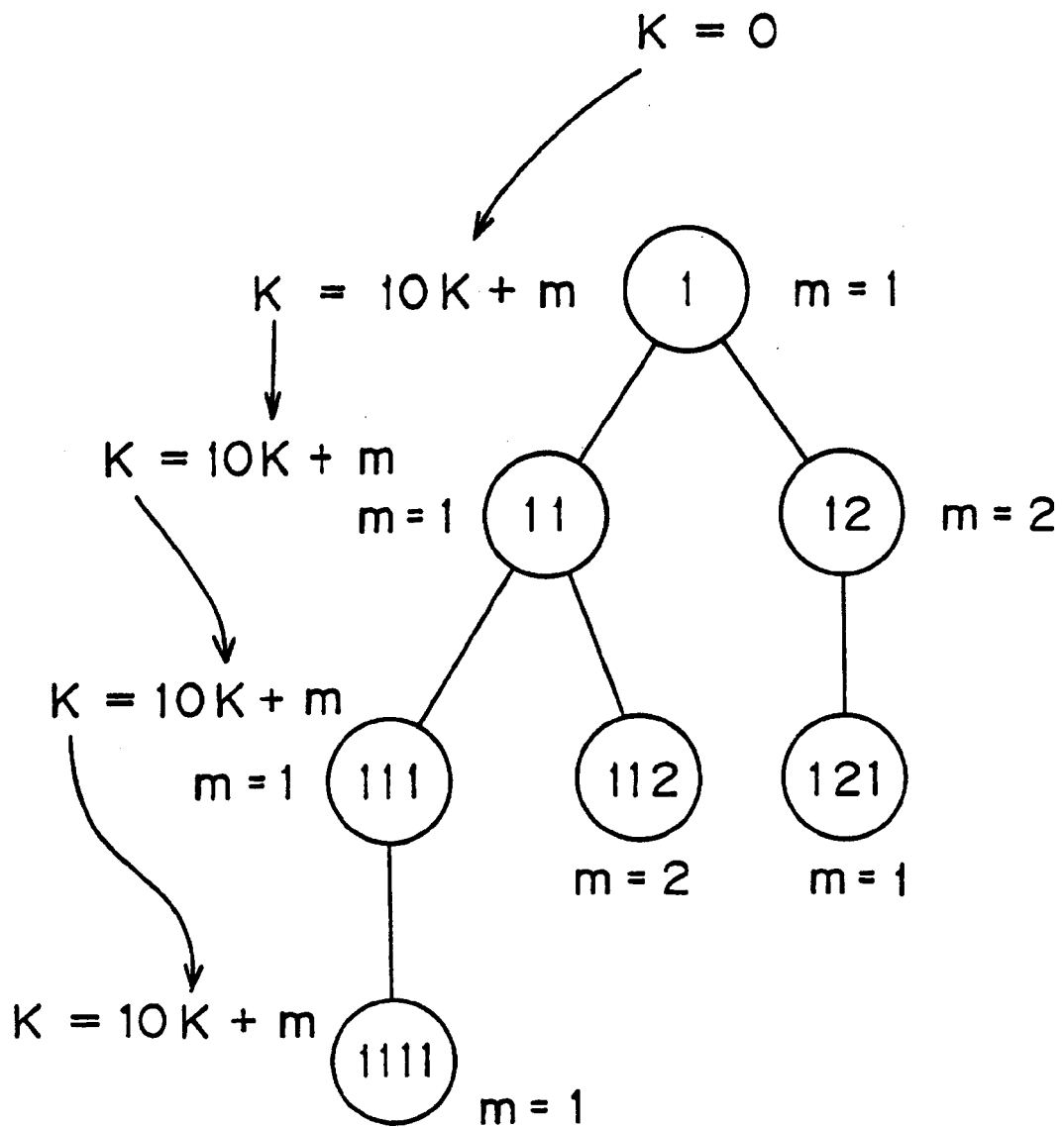
FIG. 14 shows the relationship between an item number and variables.

In step S42, the following four processes are performed, in this case, variables k and m are used. The variable "k"

indicates the hierarchical depth of an input statement, and the variable "m" indicates a serial number of answers in a particular layer. FIG. 14 shows the relationship among an item number and variables k and m.

(1) A variable m is incremented. If steps S41 through S45 are performed as step S6 shown in FIG. 13, the variable m is set to "1" by this increment process, since the variable m is initialized in step S1.

(2) An item number NT is calculated using the variable m. If steps S41 through S45 are performed as step S6 shown in FIG. 13, the item number NT becomes "1" since a variable k is also initialized in step S1.

(3) An input statement (MSG-i) inputted by a user is set as a statement MSG. If steps S41 through S45 are performed as step S6 shown in FIG. 13, a conclusion inputted by the user is set as a statement MSG.

(4) "0 (not asked)" is set as a question flag QFLG corresponding to the statement MSG set in (3).

In step S43, the item number NT, statement MSG and question flag QFLG prepared in step S42 are written in the logical structure table 13.

In step S44, the following three processes are performed.

(1) The item number NT calculated in step S42 is written in a work area NT_W.

(2) The statement MSG prepared in step S42 is written in a work area MSG_W.

(3) Data stored in a work area MSG_WORK is set as a display statement MSG_O. The work area MSG_WORK is composed of the work area NT_W and work area MSG_W.

In step S45, the display statement MSG_O is outputted. The display statement MSG_O is outputted to the client 4.

One example is shown. In this case it is assumed that the following input statement is received as a conclusion.

Whale hunting should be stopped.

/e

In this example, when a statement "Whale hunting should be stopped" is received, first, steps S42 through S45 are performed. Specifically, in steps S42 and S43, "m=1" and "k=0" are assigned to an expression for calculating an item number NT and an "item number NT=1" is obtained. The "item number=1", "Whales hunting should be stopped" and "question flag=0" are stored in the logical structure table 13. Then, in steps S44 and S45, both the "item number=1" and "Whales hunting should be stopped" are transmitted to the client 4. Then, when "/e" is received, the process terminates.

FIG. 16 is a flowchart explaining in detail the process B shown in FIG. 13. This process is performed when a user inputs a "reason".

In step S51, "1 (already asked)" is set in the question flag QFLG, and "0" is set as the variable m. In steps S52 and S53, a reason to support an assertion corresponding to the item number NT set in the record extracted in step S12, is asked.

In step S54, an answer (statement MSG-i) to the question described above, from the user, is read. In step S55, it is judged whether an input completion symbol (//e) is detected. If the input completion symbol is not detected, in step S56, the item number NT set in the record extracted in step S12 is assigned to the variable k. Furthermore, in step S57, the process A is performed. The process A is shown in FIG. 15. If the input completion symbol is detected, the process terminates.

One example is shown. In this example it is assumed that a statement "Whale hunting should be stopped" is stored. It is also assumed that the "1" is attached to the statement "whale hunting should be stopped" as an item number NT.

In this case, first, in step S51, a question flag QFLG corresponding to the statement "Whale hunting should be stopped" is updated from "0" to "1". Then, in steps S52 and S53, a question "Why can (1) be said to be correct?" is displayed on the display device of the client 4. It is assumed that in response to this question, the following answer is inputted by the user.

There is a possibility of the extinction of whales

/e

There is other food

/e

//e

In this case, processes in steps S56 and S57 are performed for the statement "There is a possibility of the extinction of whales". Specifically, in step S56, "1" is set in the variable k. Then, steps S41 through S45 shown in FIG. 15 are performed. Thus, "11" is calculated as the item number NT, and the statement "There is a possibility of the extinction of whales" is written in the logical structure table 13.

Then, in the flowchart shown in FIG. 16, the flow returns to the processes in step S54, and steps S56 and S57 are performed for "/e (temporary completion symbol)". Note that if "/e" is read, steps S42 through S45 are skipped. Thus, no special process is performed.

Furthermore, the flow returns to step S54 again, and the processes in steps S56 and S57 are performed for the statement "There is other food". As a result, by performing steps S41 through S45, "12" is calculated as the item number NT and the statement "There is other food" is written in the logical structure table 13.

Then, if "//e" is read, the process shown in FIG. 16, or the "process B" shown in FIG. 13, terminates. However, when the process B terminates in FIG. 13, the flow returns to step S11 again. Therefore, the same process is applied to the two statements ("There is a possibility of the extinction of whales" and" There is other food") newly written in the logical structure table 13. Specifically, reasons to support these two statements are asked and the answers are sequentially written in the logical structure table 13.

The processes described above (steps S11 through S14) are repeated until a statement "retain" or "self-evident" is received as an answer to each question. The embodiments are described in detail with reference to FIGS. 3 and 4. In this case, the statement "retain" or "self-evident" is also written in the logical structure table 13 like another answer. However, if a statement "self-evident" is inputted, "1" is set in the question flag in order not to repeat a question.

If the process B is performed as step S24 shown in FIG. 13, as shown in FIG. 4D, a question which has been retained is presented to the user again.

Figure 17:
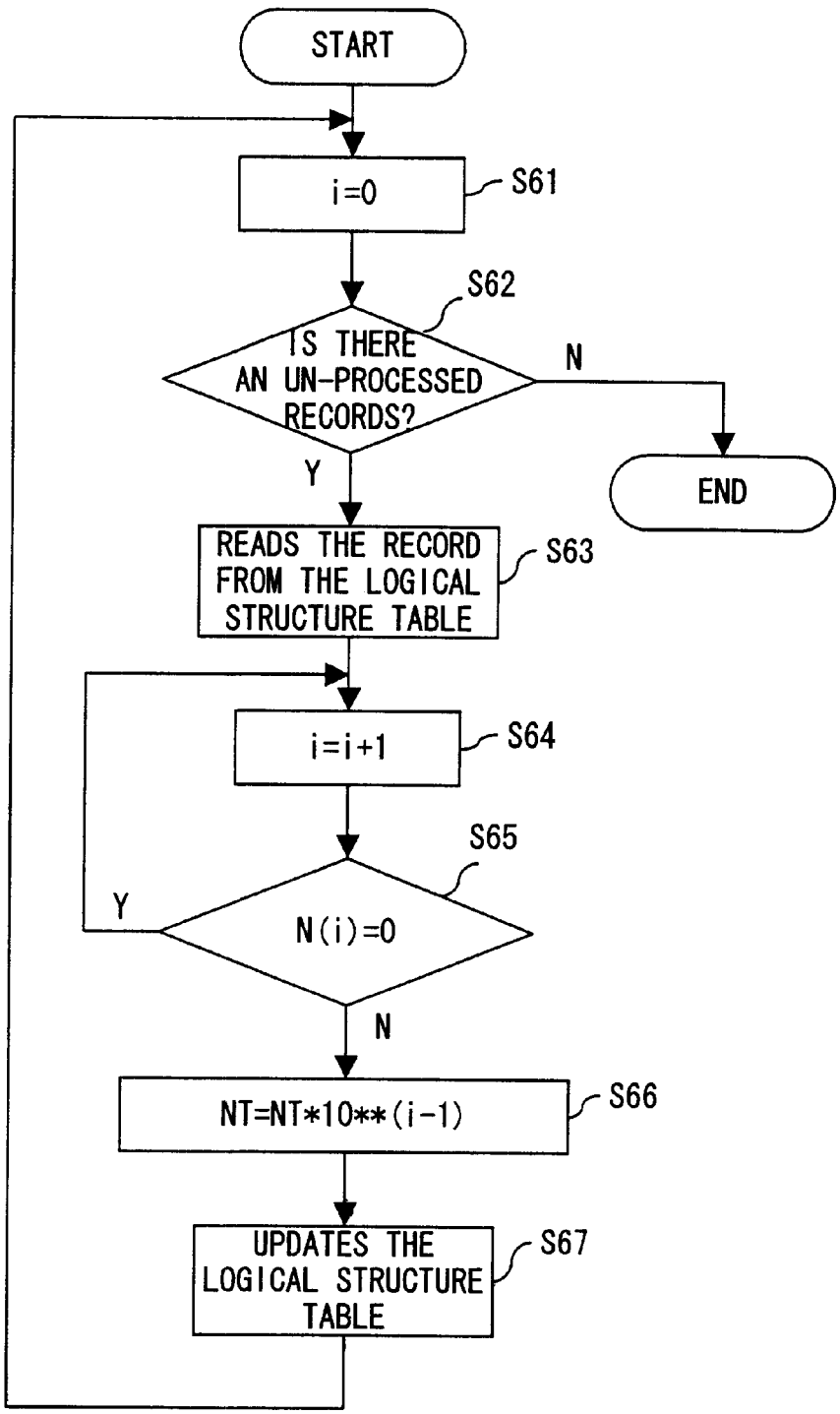
FIG. 17 is a flowchart explaining in detail the item number converting process shown in FIG. 13.

FIG. 17 is a flowchart explaining in detail the item number converting process shown in FIG. 13. In this example, the value of each digit of an item number before conversion is expressed by "N (i)". For example, if it is assumed that an item number after conversion is expressed by an integer of four digits, "NT=11" can be expressed as follows.

$$(N(1), N(2), N(3), N(4))=(0, 0, 1, 1)$$

In step S61, a variable i to be used to convert an item number NT is initialized. Step S62 is used to perform processes in steps S63 through S67 for each record of the logical structure table 13. In step S63, an un-processed record is extracted from the logical structure table 13. In step S64, the variable i is incremented. In step S65, it is judged whether the value of a digit designated by the variable i in the item number NT is "0". If this value is "0", the flow returns to step S64 and the variable i is incremented. Otherwise, the flow proceeds to step S66.

In step S66, an item number after conversion is calculated by assigning both NT and i to a given converting expression. For example, while an item number before conversion is "11" and the variable i is "1" or "2" in step S65, the judgment is yes. If the variable i becomes 3, step S66 is performed. Therefore, in this case, the item number after conversion is calculated according to the following equation.

Item number after conversion=$11\times10^2$=1100

Then, in step S67, the logical structure table 13 is updated using the calculated item number after conversion, and the flow returns to step S61 in order to extract a next record. The method for converting an item number according to the flowchart shown in FIG. 17 is one example, and the same conversion can be made by another method.

Figure 18:
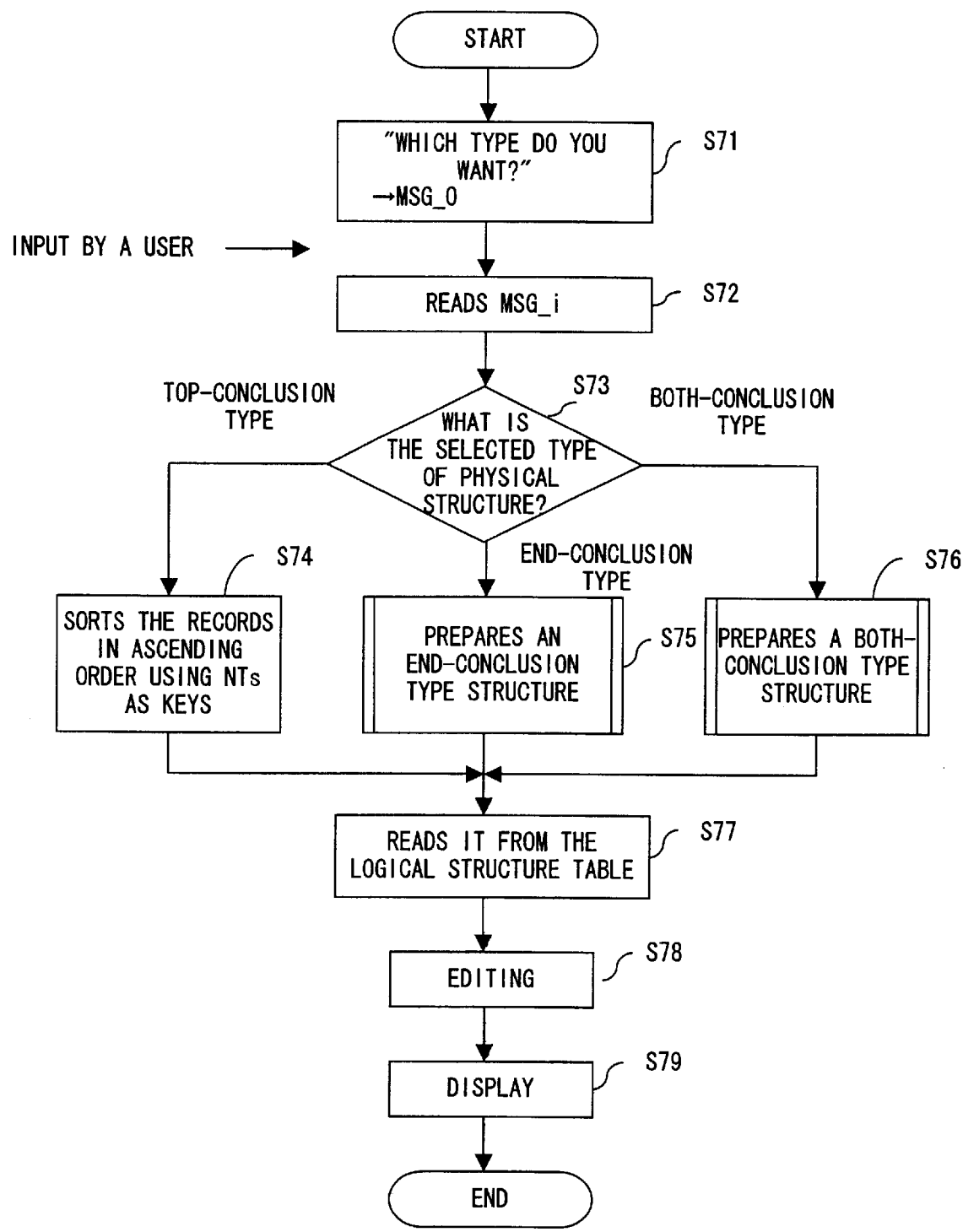
FIG. 18 is a flowchart explaining the operation of a physical structure display unit.

FIG. 18 is a flowchart explaining the operation of the physical structure display unit 15. The process in this flowchart is performed when a user inputs a request to display the physical structure of a paper. It is assumed that the logical structure is already prepared before this flowchart is activated.

In step S71, a statement for a user to designate a physical structure type is displayed on the display device of the client 4. FIG. 8A shows an example of this statement. In step S72, the statement inputted by a user is read. In step S73, the type designated by the user is detected.

If the user designates a top-conclusion type, in step S74 the logical structure table 13 is arranged in ascending order using item numbers NT as keys. If the user designates an end-conclusion type, in step S75 a corresponding process is performed. If the user designates a both-conclusion type, in step S76 a corresponding process is performed. The processes in steps S75 and S76 are described in detail later.

In steps S77 through S79, necessary data are read from the logical structure table 13 which are sorted in step S74, S75 or S76, and the designated physical structure is displayed on the display device of the client 4.

Figure 19:
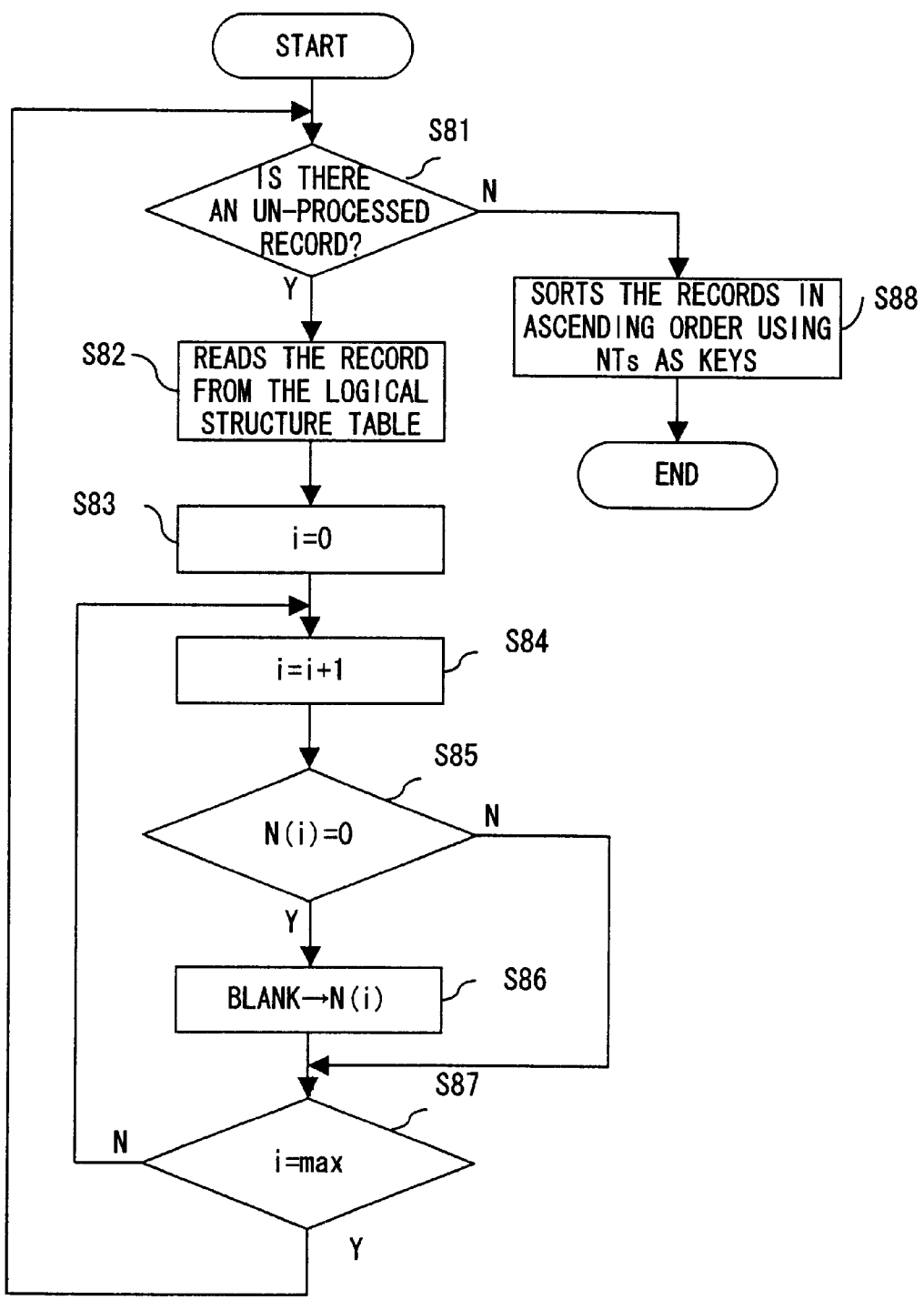
FIG. 19 is a flowchart showing the process of preparing an end-conclusion type physical structure.

FIG. 19 is a flowchart showing the process of preparing an end-conclusion type physical structure, and the process corresponds to step S75 shown in FIG. 18.

Step S81 is used to perform the processes in steps S82 through S87 for each record of the logical structure table 13. In step S82, an un-processed record is extracted from the logical structure table 13. In step S83, a variable i is initialized. In step S84, the variable i is incremented. In step S85, it is judged whether the value of a digit designated by the variable i in an item number NT is "0". Here, this item number NT is an item number after conversion in the process in the flowchart shown in FIG. 17. If this value is "0", in step S86, this "0" is replaced with "blank". If the value is not "0", step S86 is skipped.

In step S87, it is judged whether the variable i has already reached a predetermined maximum value. This maximum value is, for example, the number of digits of an item number NT after conversion.

After the processes in steps S82 through S87 are performed for all the records of the logical structure table 13, in step S88 the logical structure table 13 is sorted in ascending order using the converted item numbers NT as keys. As a result, an end-conclusion type physical structure is prepared.

FIG. 20 is a flowchart showing the process of preparing a both-conclusion type physical structure, and the process corresponds to step S76 shown in FIG. 18.

In step S91, the process in the flowchart shown in FIG. 19 is performed. Specifically, at first the end-conclusion type physical structure is prepared. In step S92, the last record of the logical structure table 13 is extracted. The last record of the logical structure table 13 edited as an end-conclusion type physical structure in step S91 stores a conclusion. Therefore, in step S92, a record of the conclusion is extracted.

In step S93, "0" is set in each digit of the item number of the record extracted in step S92. In step S94, the record is added to the logical structure table 13. Then, in step S95, the logical structure table 13, to which a new record is added, is sorted in ascending order using item numbers NT as keys. Thus, a both-conclusion type physical structure is prepared.

A physical structure prepared by the paper preparation support service of this embodiment is useful for actually preparing a paper. The preparation of a paper from a physical structure is, for example, in reality, made according to the following procedure. One example is shown.

Question: From what word is the word "Kaguya-hime" derived?

Answer: The word "Kaguya-hime" is corrupted from the word "Kagoya-hime". (conclusion)

Reason: (logical structure)

It seems that the word "Kaguya-hime" is corrupted from the word "Kagoya-hime".

It can be accepted that a bamboo-collecting old man who was a "kago" maker, went collecting bamboo, found a baby girl and called her "Kagoya-hime".

"Kaguya-hime" is introduced in the Japanese folk tale "Taketori-monogatari".

According to the folk tale, the "kago" maker found Kagoya-hime and adopted her as his daughter.

Kagoya-hime, which is the spirit of a bamboo, is found in "Japanese Folk Tales (2)" by Matsutani, Segawa and Henmi.

"We should call her "Kagoya-hime" since we make kago."

In the Japanese mountains, a "kago" maker lived. Descriptions of a "kago" maker are found in one essay "Life on a mountain" in the Collections of Kunio Yanagida, volume 1, and in an essay "People living in the mountains" by Joichi Miyamoto.

The feeling of the word "kagu" is similar to that of "kago".

The folk tale "Kaguya-hime" comes from the north-east district of Japan. The word "kago" is pronounced similar to the word "kago" in the north-east district and, for example, the word "iku (to go)" is pronounced as "igu".

(1) A title is attached.

(2) The logical development part of a paper is written. The logical development part is the body of the paper and is composed of one or a plurality of headings and a plurality of paragraphs following the headings. A heading is, for example, generated from a reason on a higher-ranking level of the prepared physical structure. In the above example, statements "The word "Kaguya-hime" is derived from the word "kagoya" (basket maker)", "The feeling of the word "Kagu" is similar to that of the word "kago"" and the like, can be generated from reasons "It seems that the word "Kaguya-hime" is corrupted from the word "Kagoya-hime" or "The word feeling of a word "kagu" is similar to that of "kago"". The plurality of paragraphs can be generated from each answer on a lower-ranking level of an answer used as a heading.

(3) The introduction of the paper is written. For the introduction, a field or an objective can be written based on questions.

(4) References are written.

(5) An abstract is written. An abstract can be obtained by simplifying the prepared physical structure, as requested.

As described above, according to the paper preparation supporting method of the embodiment, a user can obtain the logical and physical structures of a paper by answering an assertion (conclusion) of a paper and reasons to support the assertion in response to questions from the server 1 in an interaction with it. In this case, the order of questions from the server 1 is not limited to the examples described above. Specifically, in the examples, if a plurality of answers is inputted as reasons to support a specific assertion, the server 1 sequentially makes inquiries of the reasons to support each of the plurality of answers. Then, if there is a non-self-evident answer in the plurality of answers, a reason to support the non-self-evident answer is asked. However, if a plurality of answers is inputted as reasons to support a specific assertion, first, one of the plurality of answers is focused on, and questions are repeated until a reason to support the assertion becomes self-evident. Then, self-evident reasons are sequentially obtained for other assertions of the plurality of answers later.

Figure 21:
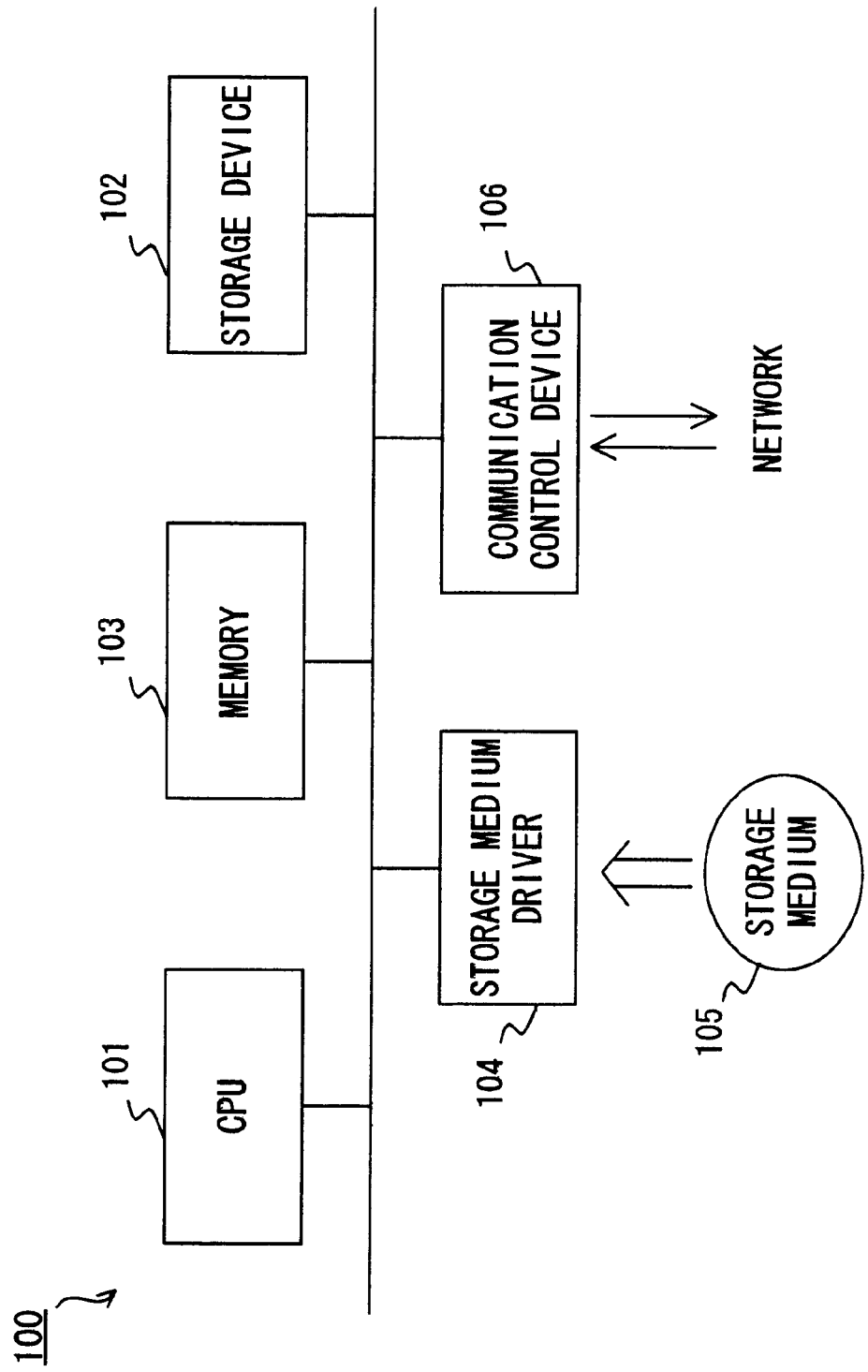
FIG. 21 shows the configuration of a computer for executing a program on which are recorded the functions of the present invention.

The paper preparation support function described above can be implemented by enabling a computer to execute a program which describes the process in the flowchart above. FIG. 21 shows the configuration of a computer 100 for executing the program. If the paper preparation supporting method of the present invention is implemented by the server/client system shown in FIG. 1, the computer 100 corresponds to the server 1. If the paper preparation supporting method of the present invention is implemented in a stand-alone environment, the computer 100 corresponds to a user computer.

A CPU 101 executes the program which describes the process in the flowchart described above by loading the program into a memory 103 from a storage device 102. The storage device 102 is, for example, a hard disk and stores the program. The memory 103 is, for example, a semiconductor memory and is used as the work area of the CPU 101.

A storage medium driver 104 accesses a portable storage medium 105 according to the instructions of the CPU 101. The portable storage medium 105 includes, for example, a semiconductor device (a PC card, etc.), a medium for inputting/outputting information by a magnetic operation (a floppy disk, a magnetic tape, etc.) and a medium for inputting/outputting information by an optical operation (an optical disk, etc.). A communication control device 106 transmits/receives data to/from a network according to the instructions of the CPU 101.

Figure 22:
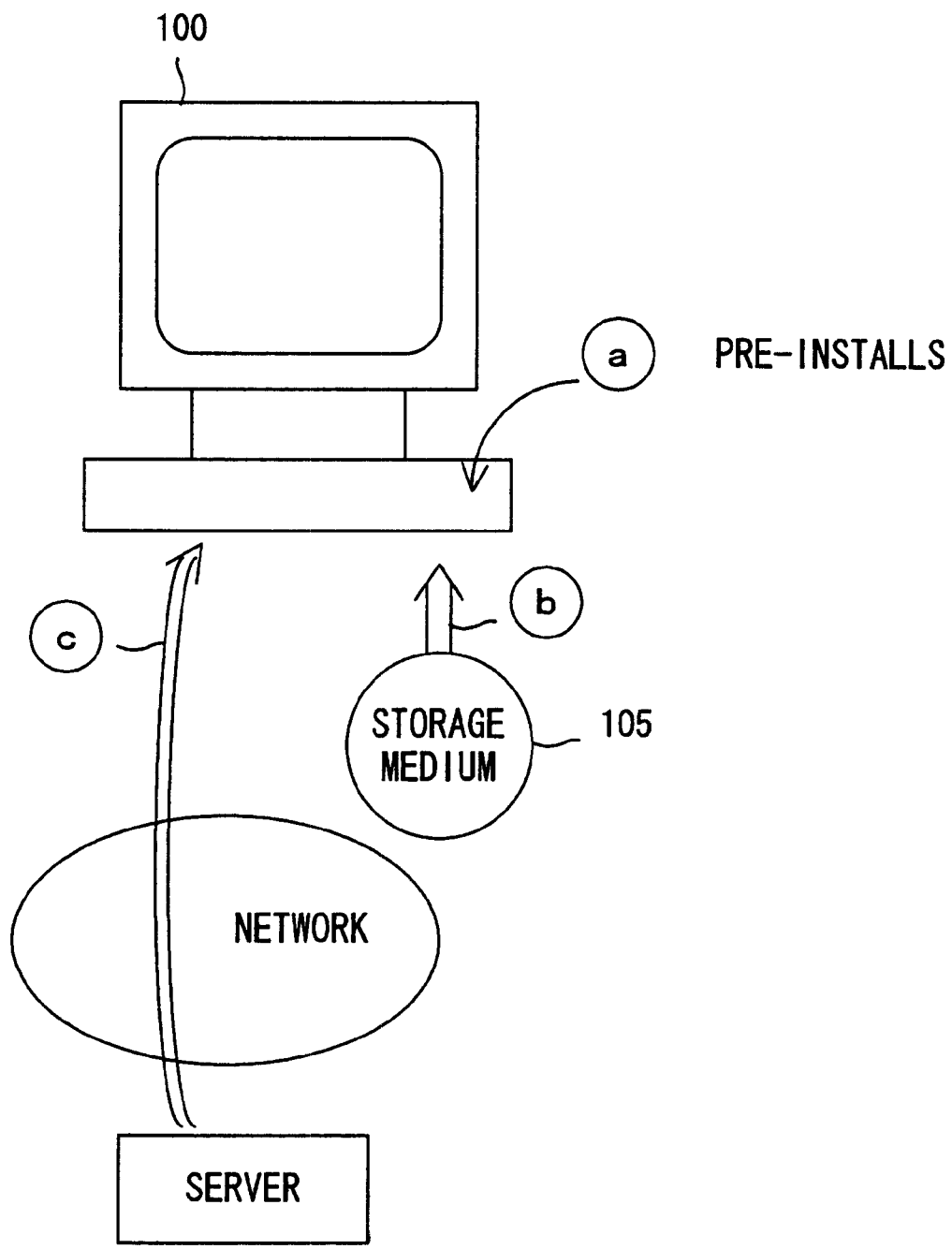
FIG. 22 explains how to provide a software program and the like of the present invention.

FIG. 22 explains a providing method of the software program of the present invention. The program of the present invention is, for example, provided by the following three methods.
(a) The program is installed and provided in the computer 100. In this case, the program and the like are, for example, pre-installed prior to shipment.
(b) The program is stored and provided in the portable storage medium. In this case, the program and the like stored in the portable storage medium 105 are basically installed in the storage device 102 through the storage medium driver 104.
(c) The program is provided by a server on a network. In this case, the program and the like are basically obtained by the computer 100 downloading the program and the like from the server.

According to the present invention, since both the assertion of a paper and reasons to support the assertion are collected and visually displayed, the logic of the paper becomes clear. In this case, if an answer given by a user is not self-evident, a reason to support the reason is further asked. Therefore, no leap in logic occurs in a target paper.

Since reasons are organized, any omission of a major reason or any contradiction between reasons can be clarified.

Since the assertion and reasons described above are arranged and displayed according to the arrangement type of a paper requested by a user, the user can freely modify the arrangement of components composing the paper without modifying the logic of the paper.

Since a hierarchical identification number is attached to each of the assertion and reasons, the hierarchical relationship between the assertion and reasons of the paper can be easily visualized.

What is claimed is:

1. A paper preparation supporting method for acquiring an assertion and a reason to arrange a structure of a paper, comprising:
    asking a user a question about an assertion of the paper or a reason of the assertion;
    analyzing an answer from the user to the question;
    asking a further reason to support the answer if the content of the answer is not judged to be self-evident;
    preparing a logical structure indicating a logic of the paper in which the assertion and the reason are related according to the answer; and
    displaying the logical structure.

2. The paper preparation supporting method according to claim 1, further comprising:
    receiving an arrangement type of the paper requested by the user;
    re-arranging the logical structure according to the arrangement type; and
    displaying the logical structure.

3. The paper preparation supporting method according to claim 1, wherein
    a hierarchical identification number for relating an answer that triggers a question and a new answer to the question is attached to the new answer, when the logical structure is prepared.

4. The paper preparation supporting method according to claim 3, wherein
    the identification number attached to the answer is converted and the logical structure is prepared by sorting the answers using the converted identification numbers as keys, when the logical structure is prepared.

5. The paper preparation supporting method according to claim 4, wherein
    the logical structure is prepared by further converting the identification number of the logical structure and sorting the answers using the converted identification numbers as keys according to a paper arrangement type requested by the user.

6. The paper preparation supporting method according to claim 1, wherein
    if a first answer to a first question is judged to be retained, the first question is made again, after receiving a second answer to a second question.

7. The paper preparation supporting method according to claim 1, wherein
    a keyword is registered, the keyword is compared with contents of the logical structure and the logical structure is corrected based on the comparison.

8. A paper preparation supporting method performed by a server device for acquiring an assertion and a reason to arrange a structure of a paper, comprising:
    asking a user a question about an assertion of the paper or a reason of the assertion through a client device;
    receiving an answer to the question from the client device input by the user;
    asking the user a further reason to support the answer through the client device if the content of the answer is not judged to be self-evident;
    preparing a logical structure indicating a logic of the paper in which the assertion and the reason are related according to the answer; and
    displaying the logical structure on the client device.

9. The paper preparation supporting method according to claim 8, wherein
    said server device receives an arrangement type of the paper requested by the user from the client device;
    said server device re-arranges the logical structure based on the arrangement type; and
    said server device displays the logical structure on the client device.

10. A paper preparation supporting method performed by a client device for acquiring an assertion and a reason to arrange a structure of a paper, comprising:
    receiving a question about an assertion of the paper or the reason of the assertion from a server device;
    displaying the question for a user;
    transmitting an answer to the question inputted by the user to the server device;
    receiving a logical structure indicating the logic of the paper prepared by the server device based on the answer from the server device; and
    displaying the logical structure.

11. The paper preparation supporting method according to claim 10, wherein
    said client device transmits the arrangement type of the paper requested by the user to said server device,
    said client device receives the logical structure re-arranged by said server device based on the arrangement type, and
    said client device displays the logical structure.

12. A paper preparation support system comprising a server device for providing a paper preparation support service and a client device for requesting the service, wherein
    the client device comprises
        a unit notifying the server device of a user input and
        a unit displaying information transmitted from the server device, and
    the server device comprises
        a unit asking the user a question about an assertion of a paper through the client device;
        a unit asking the user a question about a reason to support the assertion made by the user through the client device;
        a unit treating the reason as a new assertion and asking the user a question about a reason to support the new assertion through the client device if the reason given by the user is not self-evident;
        a unit preparing a logical structure indicating the logic of the paper based on the assertion and reason given by the user; and
        a unit displaying the prepared logical structure on the client device.

13. A paper preparation support apparatus, comprising:
    a unit asking a user a question about an assertion of a paper;
    a unit asking the user a question about a reason to support the assertion made by the user;
    a unit treating the reason as a new assertion and asking the user a question about a reason to support the new assertion if the reason given by the user is not self-evident;
    a unit preparing a logical structure indicating a logic of the paper based on the assertion and reason given by the user; and
    a unit displaying the prepared logical structure.

14. A server device which is used in a paper preparation support system comprising a server device for providing a paper preparation support service and a client device for requesting the service, comprising:
    a unit asking a user a question about an assertion of a paper through the client device;
    a unit asking the user through the client device a question about a reason to support the assertion made by the user;
    a unit treating the reason as a new assertion and asking the user a question about a reason to support the new assertion if the reason given by the user is not self-evident;
    a unit preparing a logical structure indicating a logic of the paper based on the assertion and reason given by the user; and
    a unit displaying the prepared logical structure on the client device.

15. A client device which is used in a paper preparation support system comprising a server device for providing a paper preparation support service and a client device for requesting the service, comprising:
    a unit notifying the server device of a user input; and
    a unit displaying a logical structure indicating a logic of the paper, wherein
    the server device asks the user a question about an assertion of a paper, asks the user a question about a reason to support the assertion given by the user, treats the reason as a new assertion and asks the user a question about a reason to support the new assertion if the reason given by the user is not self-evident, and prepares the logical structure based on the assertion and reason given by the user.

16. A storage medium storing a program for enabling a computer to provide a paper preparation support method, said method comprising:
    asking a user a question about an assertion of a paper;
    asking the user a question about a reason to support the assertion given by the user;
    treating the reason as a new assertion and asking the user a question about a reason to support the new assertion if the reason given by the user is not self-evident;
    preparing a logical structure indicating a logic of the paper based on the assertion and reason given by the user; and
    displaying the prepared logical structure.

17. A propagation signal transmitting a program for enabling a computer to provide a paper preparation support method, said method comprising:
    asking a user a question about an assertion of a paper;
    asking the user a question about a reason to support the assertion given by the user;
    treating the reason as a new assertion and asking the user a question about a reason to support the new assertion if the reason given by the user is not self-evident;
    preparing a logical structure indicating a logic of the paper based on the assertion and reason given by the user; and
    displaying the prepared logical structure.

* * * * *